(12) United States Patent
Negishi et al.

(10) Patent No.: US 9,960,393 B2
(45) Date of Patent: May 1, 2018

(54) BATTERY AND SEAL UNIT

(71) Applicant: KABUSHIKI KAISHA TOSHIBA, Minato-ku (JP)

(72) Inventors: Nobuyasu Negishi, Kashiwazaki (JP); Tatsuya Hashimoto, Kashiwazaki (JP); Tatsuya Shinoda, Kashiwazaki (JP); Koichi Kawamura, Fuchu (JP); Naoki Iwamura, Kashiwazaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 95 days.

(21) Appl. No.: 15/223,934

(22) Filed: Jul. 29, 2016

(65) Prior Publication Data

US 2016/0336554 A1 Nov. 17, 2016

Related U.S. Application Data

(63) Continuation of application No. PCT/JP2015/052552, filed on Jan. 29, 2015.

(30) Foreign Application Priority Data

Jan. 29, 2014 (JP) .................................. 2014-014878
Dec. 26, 2014 (JP) .................................. 2014-265264

(51) Int. Cl.
*H01M 2/08* (2006.01)
*H01M 10/0525* (2010.01)
(Continued)

(52) U.S. Cl.
CPC ............... *H01M 2/08* (2013.01); *F16J 15/08* (2013.01); *F16J 15/10* (2013.01); *F16J 15/104* (2013.01);
(Continued)

(58) Field of Classification Search
CPC ...... H01M 10/0525; H01M 2/06; H01M 2/08; H01M 2/26; H01M 2/30
See application file for complete search history.

(56) References Cited

U.S. PATENT DOCUMENTS 5,029,906 A 7/1991 Chelette et al.
5,586,993 A 12/1996 Saito et al.
(Continued)

FOREIGN PATENT DOCUMENTS

EP 0 685 895 A1 12/1995
GB 1 466 575 3/1977
(Continued)

OTHER PUBLICATIONS

International Search Report dated Apr. 14, 2015 in PCT/JP2015/052552, filed on Jan. 29, 2015 (with English Translation).
(Continued)

*Primary Examiner* — Carlos Barcena
(74) *Attorney, Agent, or Firm* — Oblon, McClelland, Maier & Neustadt, L.L.P.

(57) ABSTRACT

A battery disclosed herein includes a container member housing an electrode body and a lead, a gasket, an external terminal, and a restraining member. The container member includes a terminal-connecting part having a thickness of 0.3 mm or less. The terminal-connecting part includes a through hole including a rising part. The gasket includes a hollow shaft inserted into the rising part. The external terminal includes a terminal shaft. The terminal shaft includes a diameter-reduction part. The restraining member restrains at least a part of the diameter-reduction part of the terminal shaft via the diameter-reduction part of the rising part and the shaft of the gasket. The inclination angle of the rising part is larger than the inclination angle of the terminal shaft.

17 Claims, 16 Drawing Sheets

(51) Int. Cl.
*H01M 2/06* (2006.01)
*F16J 15/10* (2006.01)
*H01M 2/30* (2006.01)
*F16J 15/08* (2006.01)
*H01M 2/26* (2006.01)

(52) U.S. Cl.
CPC ............... *H01M 2/06* (2013.01); *H01M 2/30* (2013.01); *H01M 10/0525* (2013.01); *H01M 2/26* (2013.01)

(56) References Cited

U.S. PATENT DOCUMENTS

| | | |
|---|---|---|
| 5,665,483 A | 9/1997 | Saito et al. |
| 2001/0004505 A1 | 6/2001 | Kim et al. |
| 2010/0291435 A1 | 11/2010 | Garin et al. |
| 2013/0136977 A1 | 5/2013 | Masuda |
| 2013/0288109 A1 | 10/2013 | Garin et al. |
| 2014/0322594 A1 | 10/2014 | Garin et al. |
| 2016/0218346 A1 | 7/2016 | Garin et al. |

FOREIGN PATENT DOCUMENTS

| | | | |
|---|---|---|---|
| JP | 55-44815 U | 3/1980 | |
| JP | 2001-196047 | 7/2001 | |
| JP | 2003-115286 | 4/2003 | |
| JP | 2005-56649 | 3/2005 | |
| JP | 2005129488 A * | 5/2005 | ............. H01M 2/06 |
| JP | 2009-48969 | 3/2009 | |
| JP | 2012-226834 | 11/2012 | |
| JP | 2012-226836 | 11/2012 | |
| JP | 2012-227026 | 11/2012 | |
| JP | 2012-238510 | 12/2012 | |
| JP | 2013-137990 | 7/2013 | |
| JP | 2013-149476 | 8/2013 | |
| WO | WO 2010/127289 A1 | 11/2010 | |

OTHER PUBLICATIONS

Written Opinion dated Apr. 14, 2015 in PCT/JP2015/052552, filed on Jan. 29, 2015.
European Communication Pursuant to Rule 164(1) EPC dated Jun. 29, 2017 in Patent Application No. 15743020.8.

* cited by examiner

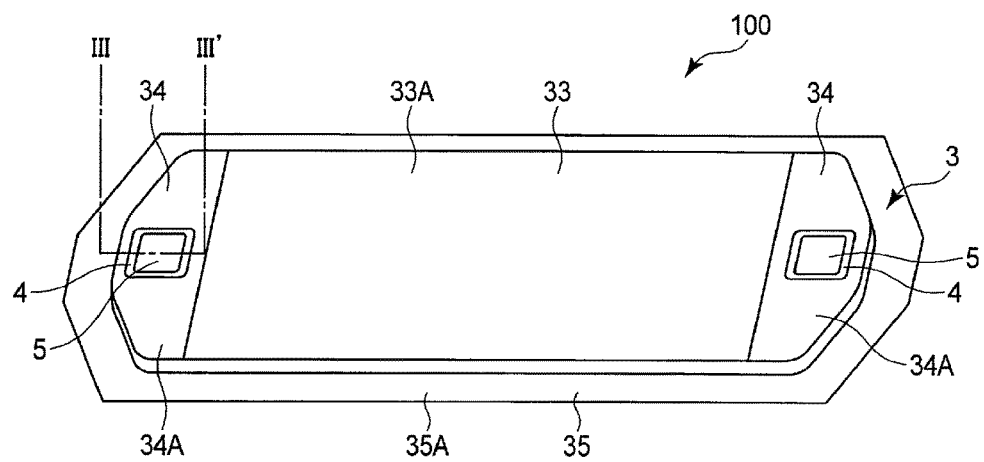
F I G. 1

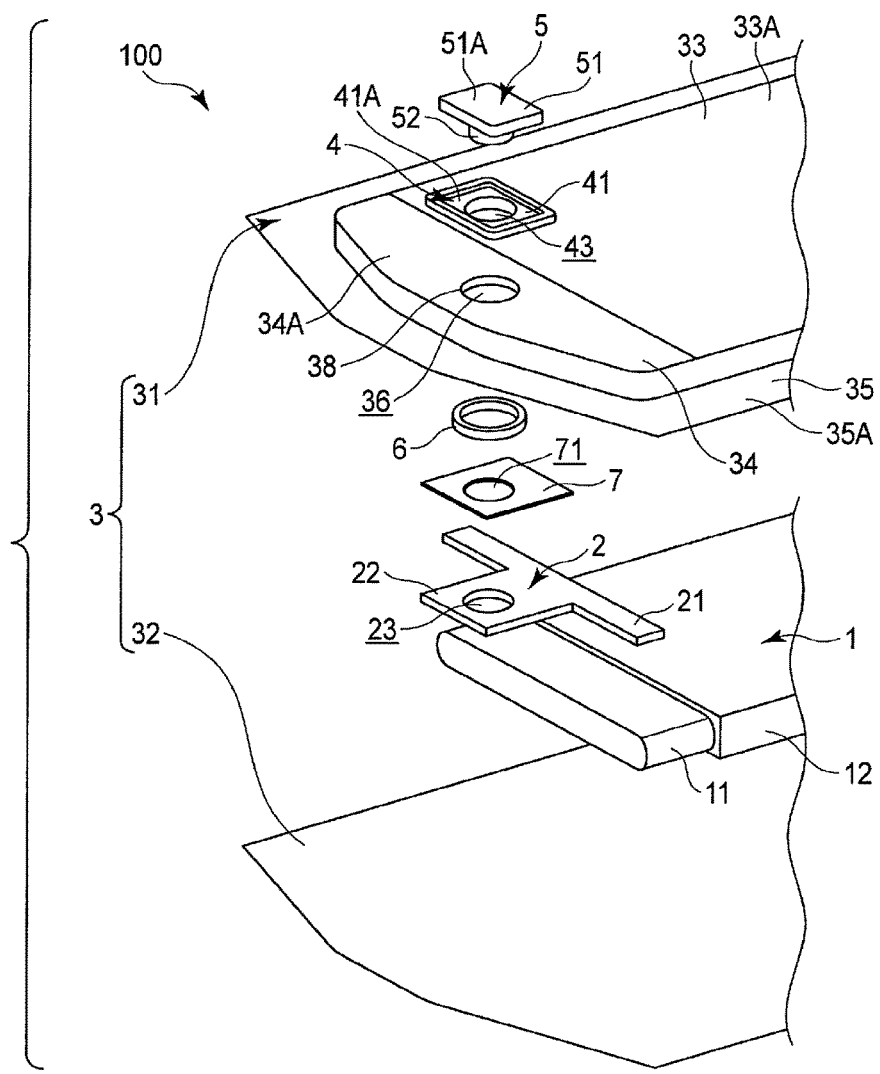
F I G. 2

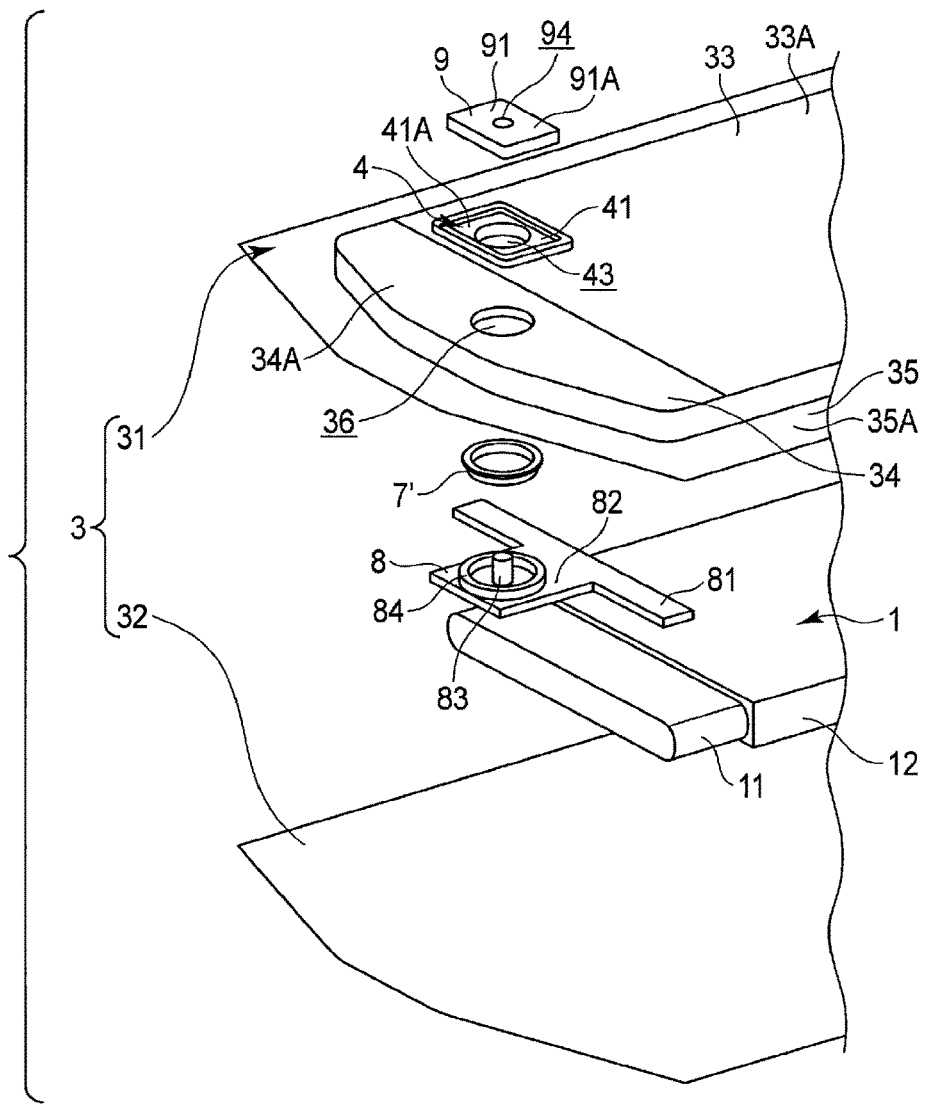
F I G. 7

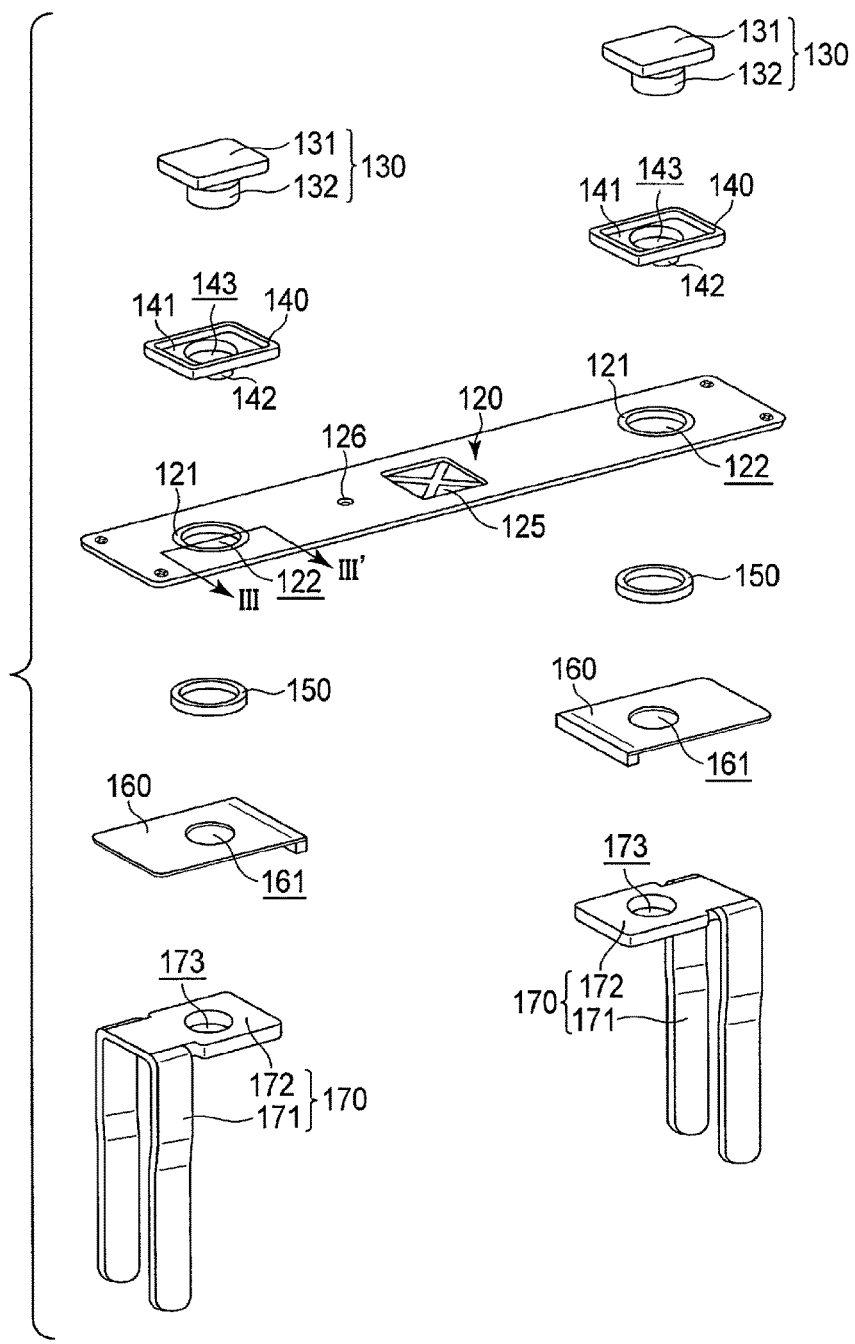
F I G. 14

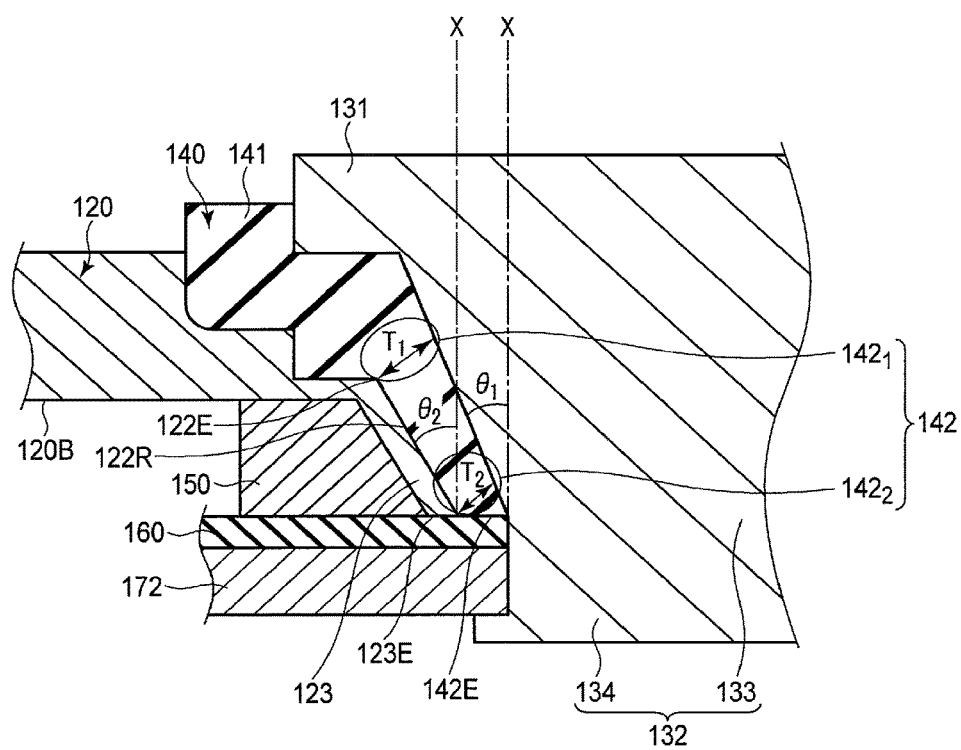
F I G. 17

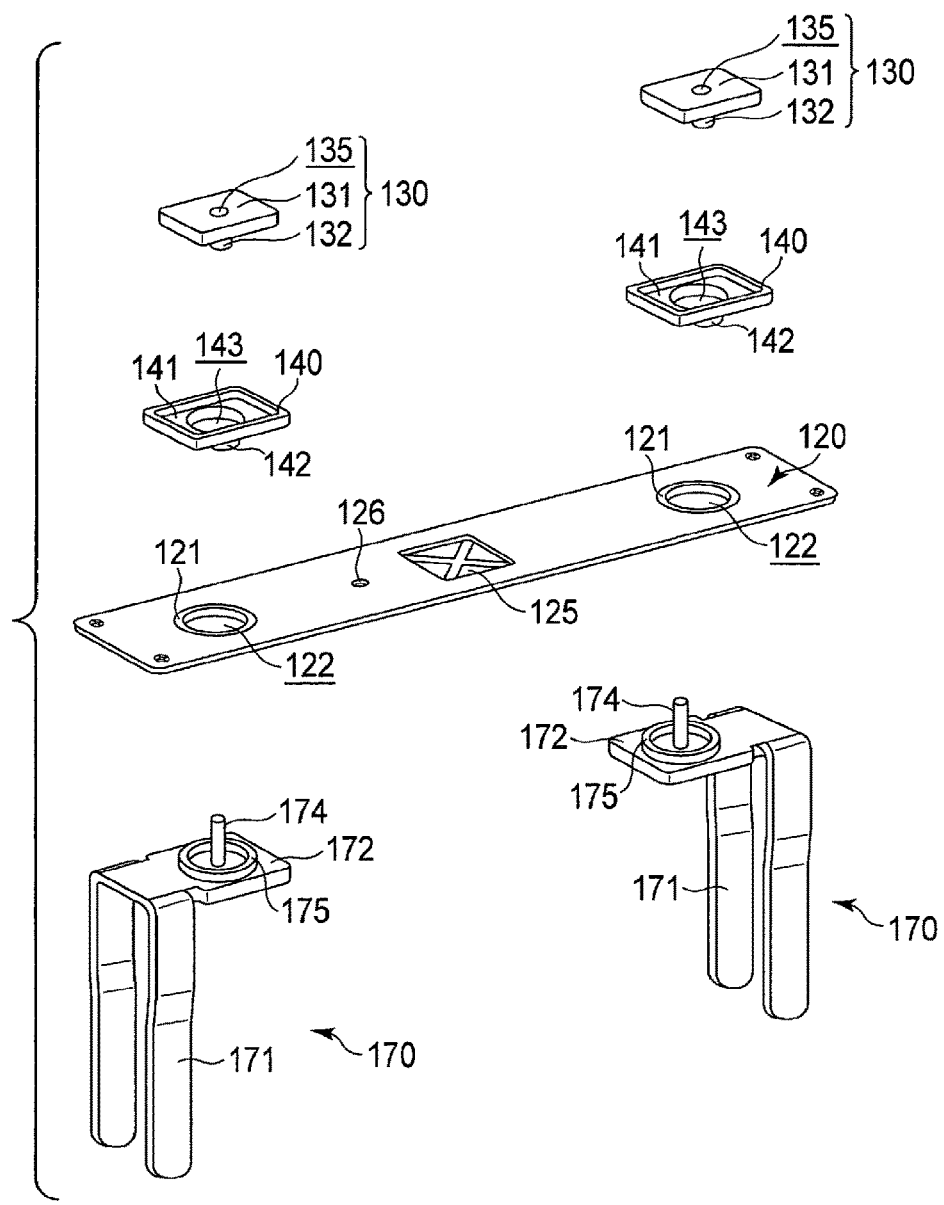
F I G. 20

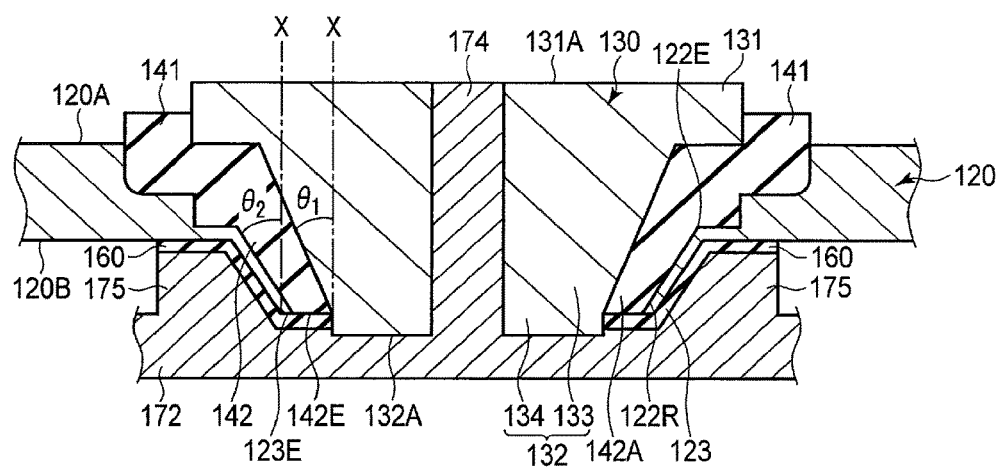
F I G. 21

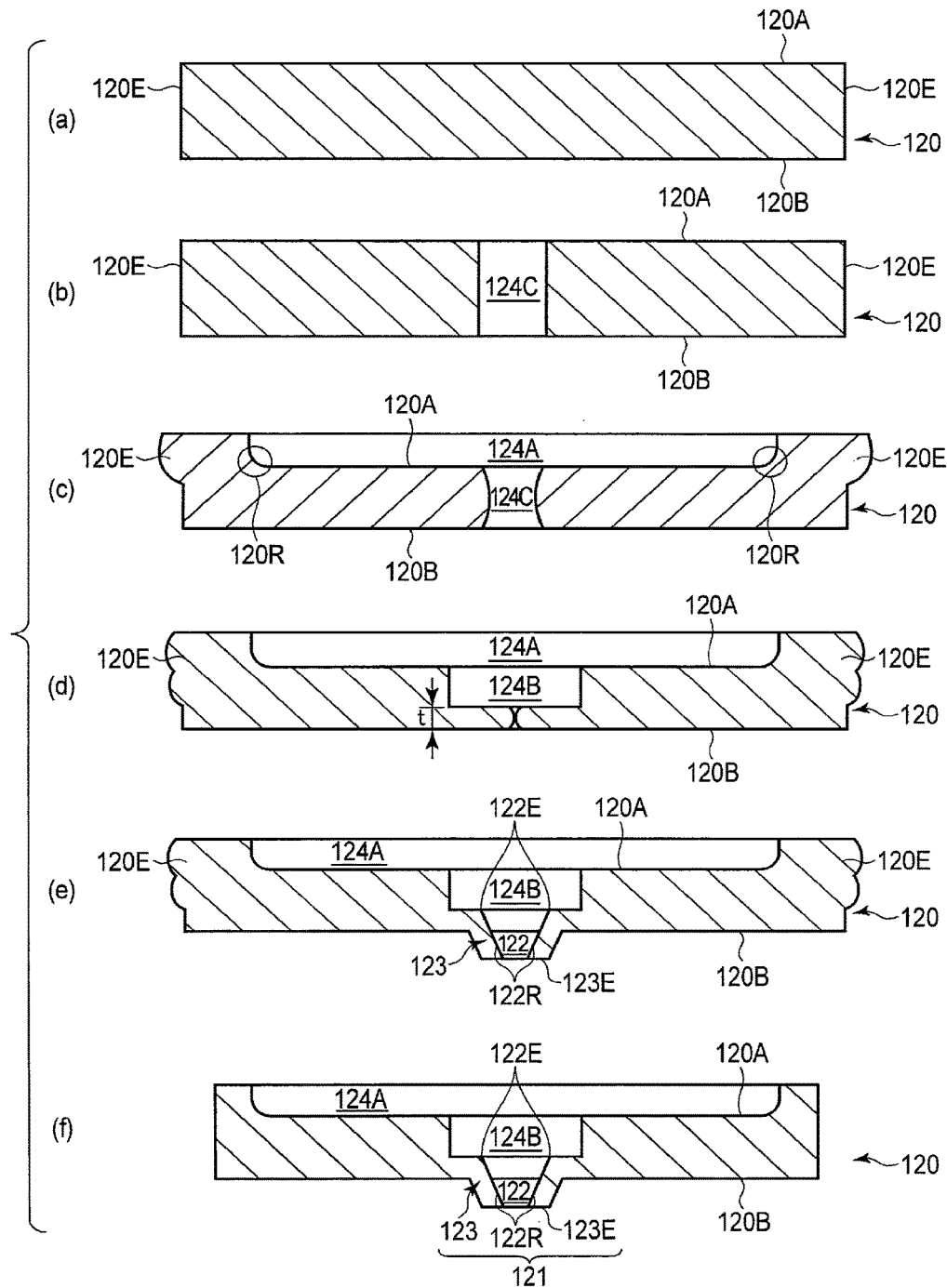
F I G. 22

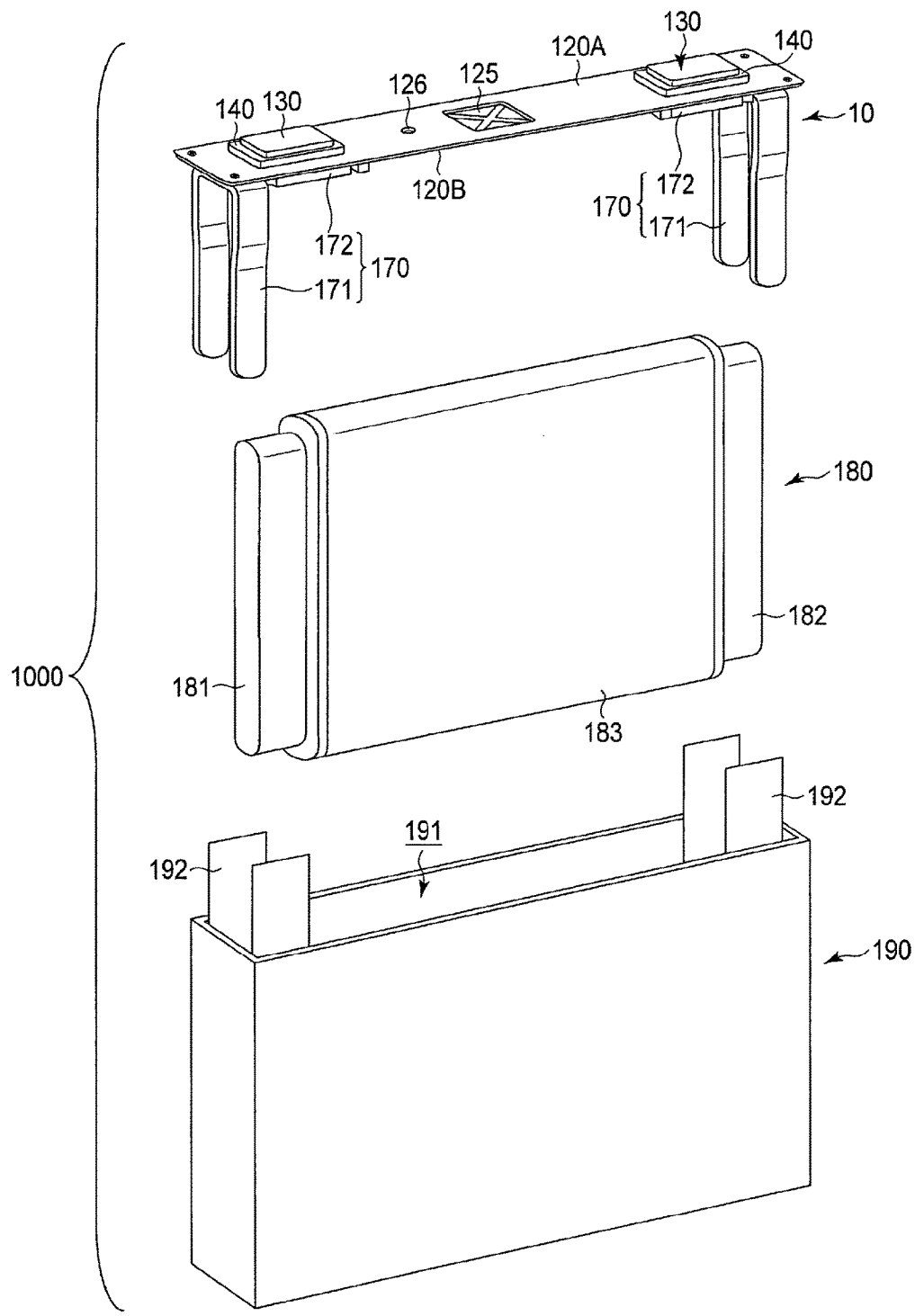
F I G. 23

BATTERY AND SEAL UNIT

CROSS-REFERENCE TO RELATED APPLICATIONS

This application is a Continuation application of PCT Application No. PCT/JP2015/052552, filed Jan. 29, 2015 and based upon and claiming the benefit of priority from the Japanese Patent Applications No. 2014-014878, filed Jan. 29, 2014; and No. 2014-265264, filed Dec. 26, 2014, the entire contents of all of which are incorporated herein by reference.

FIELD

Embodiments of the present invention relate to a battery and a seal unit.

BACKGROUND

Generally, a battery such as a primary battery and a secondary battery includes an electrode body including a positive electrode and a negative electrode, and an container member housing the electrode body.

Presently, a metal can has been put to practical use as the container member housing the positive electrode and negative electrode or the like of the battery. In a sealed battery using the metal can, the opening of the metal can is sealed with a lid. A through hole for fixing an output terminal is present in the lid. The output terminal is fixed in a state where it passes through the lid up and down via a gasket made of resin or rubber. The gasket serves as an insulator avoiding direct contact between the output terminal and the lid. In this case, the output terminal includes a head part exposed from the external surface of the gasket and a shaft fitted into the gasket. The shaft of the output terminal is subjected to a pressure by a press including a punch which apples a pressure to the shaft perpendicularly to a direction in which the shaft extends to caulk the output terminal. The caulking expands the shaft and presses the cylindrical shaft of the gasket against the side wall of the through hole of the lid, to fix the output terminal and the gasket.

The lid of the metal can may have a structure for fixing the output terminal in order to exhibit high sealing performance of the battery together with the gasket. Such a structure can be formed by, for example, deep drawing or the like.

On the other hand, a laminate including a metal or metal layer and resin layer and having a small thickness can be used as the other container member housing the electrodes of the battery. Such a container member is generally more lightweight than the metal can. Therefore, the use of such a container member can provide a battery having a higher energy density per weight.

BRIEF DESCRIPTION OF DRAWINGS

FIG. 1 is a schematic perspective view of a battery as a first example according to a first embodiment.

FIG. 2 is a schematic exploded perspective view of an end part including a positive electrode terminal of the battery as the first example.

FIG. 7 is a schematic exploded perspective view of an end part including a positive electrode terminal of the battery as the second example.

FIG. 14 is a schematic exploded perspective view of the seal unit of FIG. 13.

FIG. 17 is an enlarged sectional view of a portion v of FIG. 16.

FIG. 20 is a schematic exploded perspective view of the seal unit shown in FIG. 19.

FIG. 21 is a schematic sectional view taken along line IX-IX' of the seal unit shown in FIG. 19.

FIG. 22 shows an example of a production process of a terminal-connecting part of the seal member which can be included in the seal unit according to the second embodiment.

FIG. 23 is a schematic exploded perspective view of a battery as an example according to a third embodiment.

DETAILED DESCRIPTION

Figure 3:
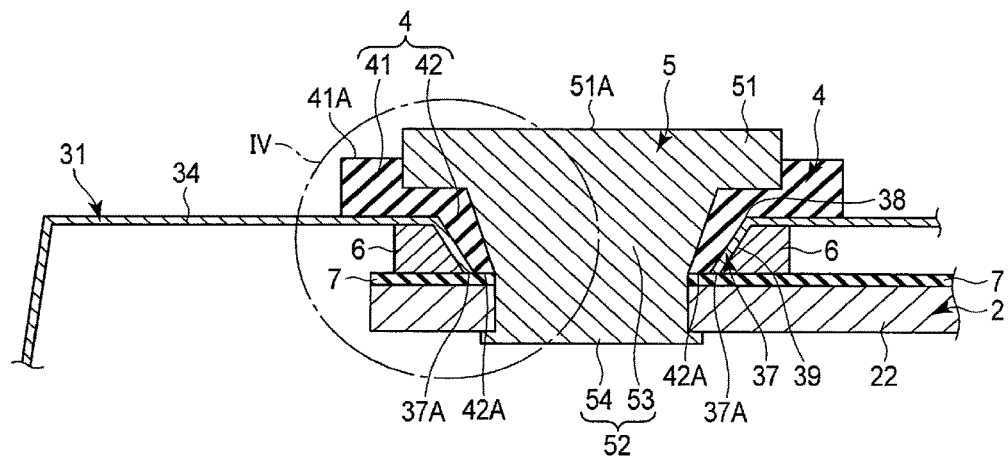
FIG. 3 is a schematic sectional view taken along line segment III-III' of the battery shown in FIG. 1.

In general, according to an embodiment, a battery is provided. The battery includes an electrode body, a lead electrically connected to the electrode body, a container member housing the electrode body and the lead, a gasket, an external terminal, and a restraining member. The container member includes a terminal-connecting part having a thickness of 0.3 mm or less. The terminal-connecting part includes a through hole and a rising part extending toward an inside of the container member from an edge part of the through hole. The rising part includes a diameter-reduction part having a diameter reduced along a direction toward the inside of the container member from the edge part of the through hole. The gasket includes a hollow shaft. The hollow shaft of the gasket is inserted into the rising part. The external terminal includes a first end part and a second end part, and includes a terminal shaft extending to an axial direction toward the second end part from the first end part. The terminal shaft passes through the shaft of the gasket, and is electrically connected to the lead. The terminal shaft includes a diameter-reduction part having a diameter reduced along the axial direction. The restraining member restrains at least a part of the diameter-reduction part of the terminal shaft via the diameter-reduction part of the rising part and the shaft of the gasket. The inclination angle of the diameter-reduction part of the rising part to the axial direction of the terminal shaft is larger than the inclination angle of the diameter-reduction part of the terminal shaft to the axial direction of the terminal axial part.

Hereinafter, the embodiments will be described with reference to the drawings. The same reference numerals denote common portions throughout the embodiments and overlapping descriptions are avoided. Each of these drawings is a typical view for descriptions and promotion of the understanding of the embodiment. Though there are parts different from an actual device in shape, dimension and ratio, these structural designs may be properly changed taking the following descriptions and known technologies into consideration.

First Embodiment

According to a first embodiment, a battery is provided. The battery includes an electrode body, a lead electrically connected to the electrode body, a container member housing the electrode body and the lead, a gasket, an external terminal, and a restraining member. The container member includes a terminal-connecting part having a thickness of 0.3 mm or less. The terminal-connecting part includes a through hole and a rising part extending toward an inside of the container member from an edge part of the through hole. The rising part includes a diameter reduction part having a diameter reduced along a direction toward the inside of the container member from the edge part of the through hole. The gasket includes a hollow shaft. The hollow shaft of the gasket is inserted into the rising part. The external terminal includes a first end part and a second end part, and includes a terminal shaft extending to an axial direction toward the second end part from the first end part. The terminal shaft passes through the shaft of the gasket, and is electrically connected to the lead. The terminal shaft includes a diameter-reduction part having a diameter reduced along the axial direction. The restraining member restrains at least a part of the diameter-reduction part of the terminal shaft via the diameter-reduction part of the rising part and the shaft of the gasket. The inclination angle of the diameter-reduction part of the rising part to the axial direction of the terminal shaft is larger than the inclination angle of the diameter-reduction part of the terminal shaft to the axial direction of the terminal shaft.

It may be difficult to subject a portion having a small thickness of, for example, 0.3 mm or less in a plate to deep drawing or the like because of the small thickness. Therefore, it may be difficult to provide the same terminal structure as that capable of being provided on a lid of a metal can by deep drawing on a terminal-connecting part having a small thickness.

As a result of intensive studies from such a background, the inventors could provide a terminal structure capable of exhibiting high sealing performance on a terminal-connecting part having a small thickness. That is, in the battery according to the first embodiment, the terminal-connecting part having a thickness of 0.3 mm or less can include the terminal structure capable of exhibiting high sealing performance. Hereinafter, regarding the battery according to the first embodiment, the reason why the terminal structure provided on the terminal-connecting part having a small thickness can exhibit high sealing performance will be described.

First, in the battery according to the first embodiment, a terminal-connecting part of a container member includes a through hole and a rising part extending toward an inside of the container member from an edge part of the through hole. The rising part includes a diameter-reduction part having a diameter reduced along a direction toward the inside of the container member from the edge part of the through hole. A hollow shaft of a gasket is inserted into the rising part. The terminal shaft of the external terminal passes through the shaft of the gasket. The terminal shaft of the external terminal includes a diameter-reduction part having a diameter reduced along the axial direction. The inclination angle of the rising part to the axial direction of the terminal shaft is larger than the inclination angle of the terminal shaft to the axial direction of the terminal shaft.

A portion sandwiched between the diameter-reduction part of the rising part and the diameter-reduction part of the terminal shaft which have such different angles of inclination in the shaft of the gasket is subjected to pressure from the diameter-reduction part of the terminal shaft and the diameter-reduction part of the rising part.

On the other hand, in the battery according to the first embodiment, the restraining member restrains at least a part of the diameter-reduction part of the terminal shaft via the diameter-reduction part of the rising part and the shaft of the gasket. Therefore, pressure applied to the gasket from the diameter-reduction part of the terminal shaft is transmitted to the diameter-reduction part of the rising part, and eventually the restraining member. The restraining member can transmit a counteraction against the pressure from the diameter-reduction part of the terminal shaft as a restraining force to the gasket through the diameter-reduction part of the rising part.

Thus, in the battery according to the first embodiment, the gasket can be subjected to the pressure from the diameter-reduction part of the terminal shaft, and the pressure and the restraining force from the diameter-reduction part of the rising part. Because of this, the battery according to the first embodiment can achieve high tightness of contact between the terminal axial part and the gasket and of contact between the rising part and the gasket, and as a result can exhibit high sealing performance.

Since a portion sandwiched between the diameter-reduction part of the rising part and the diameter-reduction part of the terminal shaft in the shaft of the gasket is subjected to the pressure from the diameter-reduction part of the rising part of the container member and the diameter-reduction part of the terminal shaft, as described above, the portion may be compressed. Thereby, the shaft of the gasket can include portions having different thicknesses. Since the diameters of the diameter-reduction part of the rising part and diameter-reduction part of the terminal shaft are reduced along a direction toward the inside of the container member, a portion which is farther from the edge part of the through hole of the container member among the portion sandwiched between the diameter-reduction part of the rising part and the diameter-reduction part of the terminal shaft in the shaft of the gasket may be subjected to larger pressure. Therefore, a portion having the maximum thickness of the shaft of the gasket, i.e., a portion subjected to less pressure and having a small compression ratio, a portion not subjected to pressure and not compressed, or a portion expanded by elastic deformation caused by the compression of a part of the shaft of the gasket may be disposed closer to the edge part of the through hole of the container member than a portion having the minimum thickness of the shaft of the gasket, i.e., a portion largely compressed by large pressure. That is, when the portion having the maximum thickness of the axial part of the gasket is defined as a first portion and the portion having the minimum thickness of the axial part of the gasket is defined as a second portion, the first portion may be disposed closer to the edge part of the through hole of the container member than the second portion.

The rising part of the container member included in the battery according to the first embodiment can be formed by burring. Generally, stress occurring in a workpiece in the burring can be made smaller than that in deep drawing. Therefore, in the battery according to the first embodiment, the rising part can be formed in the terminal-connecting part having a thickness of 0.3 mm or less by burring. That is, the first embodiment can provide the battery in which the terminal-connecting part having a small thickness can include the terminal structure capable of exhibiting high sealing performance.

The inclination angle of the rising part, the inclination angle of the terminal shaft, and the thickness of the shaft of the gasket in the battery can be measured in the following procedures, for example. First, a resin is injected into the battery, and the resin is cured. By cutting through a battery having the cured inner part, the cross-sectional surface of the battery can be obtained while the positions of the lead, the container member, the gasket, the external terminal, and the restraining member are maintained.

The inclination angle can be confirmed from cross-sectional surfaces obtained by cutting through the battery in an x direction, a y direction, and a direction of 45 degrees on the basis of the axial direction of the external terminal, for example. When the diameter-reduction part arrives at the tip of the rising part, regarding the inclination angle of the diameter-reduction part of the rising part, the inclination angle in the tip of the rising part is measured as the inclination angle of the diameter-reduction part of the rising part. On the other hand, when the diameter-reduction part does not arrive at the tip of the rising part, the inclination angle of a portion close to the tip of the rising part in the diameter-reduction part is measured as the inclination angle of the diameter-reduction part of the rising part. When the diameter-reduction part of the rising part arrives at the tip of the rising part, regarding the inclination angle of the diameter reduction part of the external terminal, the inclination angle of a portion sandwiching a part of the gasket together with the tip of the rising part is measured as the inclination angle of the diameter-reduction part of the external terminal. On the other hand, when the diameter-reduction part does not arrive at the tip of the rising part, the inclination angle of a portion sandwiching a part of the gasket together with a portion close to the tip of the rising part in the diameter-reduction part of the rising part is measured as the inclination angle of the diameter-reduction part of the external terminal.

The thickness of the shaft of the gasket can be confirmed from the cross-sectional surface obtained by cutting through the battery along the axial direction of the external terminal, for example. The thickness of the shaft of the gasket is measured as a thickness in a direction perpendicular to the surface of the rising part with which the shaft of the gasket is in contact.

Next, the battery according to the first embodiment will be described in more detail.

The battery according to the first embodiment may be a primary battery or a secondary battery. Examples of the battery according to the first embodiment include a lithium-ion secondary battery. Since the battery according to the first embodiment can exhibit high sealing performance as described above, a nonaqueous electrolyte secondary battery encompassed in the first embodiment can prevent the infiltration of moisture into the battery and the leakage of a nonaqueous electrolyte, for example, and eventually can prevent problems such as deterioration in battery performance.

The battery according to the first embodiment includes an electrode body, a lead, a container member, a gasket, an external terminal, and a restraining member.

The electrode body can include a positive electrode and a negative electrode. The positive electrode can include a positive electrode current collector, a positive electrode material layer formed thereon, and a positive electrode current-collecting tab, for example. The negative electrode can include a negative electrode current collector, a negative electrode material layer formed thereon, and a negative electrode current-collecting tab, for example. The positive electrode material layer can contain a positive electrode active material, a conductive agent, and a binder, for example. The negative electrode material layer can contain a negative electrode active material, a conductive agent, and a binder, for example. The positive electrode material layer and the negative electrode material layer may be disposed to be opposed to each other.

The electrode body can further include a separator provided between the positive electrode material layer and negative electrode material layer opposed to each other.

The structure of the electrode body is not particularly limited. For example, the electrode body can have a stack structure. The stack structure has a structure in which a positive electrode and a negative electrode, which are described above, are stacked with a separator sandwiched therebetween. Alternatively, the electrode group can have a coiled structure. The coiled structure is a structure in which a laminate obtained by, as described above, stacking a positive electrode and a negative electrode with a separator sandwiched therebetween is coiled in a spiral form.

The lead is electrically connected to the electrode body. Particularly, the battery according to the first embodiment can include two leads. For example, one lead can be electrically connected to the positive electrode of the electrode body, and the other lead can be electrically connected to the negative electrode of the electrode body.

An insulating member can be provided on the surface of the lead for the purpose of insulating the lead from the other members.

The container member innerly houses the electrode body and the lead. The container member includes a terminal-connecting part having a thickness of 0.3 mm or less. The container member may have a thickness of 0.3 mm or less at not only the terminal-connecting part but also over the entire region. Alternatively, in the container member, the thickness of a portion other than the terminal-connecting part may be more than 0.3 mm.

The container member can be formed of a metal, an alloy or a laminate of a resin layer and a metal layer and/or an alloy layer, for example. The container member formed from a metal, an alloy or a laminate of a resin layer and a metal layer and/or an alloy layer can have a thickness of 0.03 mm to 0.3 mm, for example.

The container member may be a single member, or include two or more members.

The container member can have a space for housing the electrode body and the lead. The space for housing the electrode body and the lead can be provided by subjecting the container member to, for example, shallow drawing to form a recessed part. Alternatively, the container member is subjected to shallow drawing to form two recessed parts, and the container member is then bent to oppose the recessed parts to each other so that a larger space is formed from the spaces of the recessed parts, and thereby the space for housing the electrode body and the lead can be provided.

The container member can further include a liquid inlet for injecting an electrolytic solution, for example, a non-aqueous electrolyte, and a safety valve capable of releasing the internal pressure of the battery when the internal pressure is increased to a specified value or more, or the like.

The gasket can also include a flange part for fixing the gasket to the terminal-connecting part of the container member, for example.

A terminal shaft of the external terminal includes a first end part and a second end part. The first end part may be a flange part for fixing the terminal shaft to the gasket, for example.

The external terminal is electrically connected to the lead. Particularly, the battery according to the first embodiment can include two external terminals. For example, one external terminal can be connected to the lead which may be electrically connected to the positive electrode of the electrode body. The other external terminal can be connected to the lead which may be electrically connected to the negative electrode of the electrode body.

In the battery according to the first embodiment, the form of connection between the external terminal and the lead is not particularly limited.

For example, a through hole is formed in a lead, and a terminal shaft of an external terminal is fitted into the through hole, to allow connection between the external terminal and the lead.

Alternatively, a through hole is further formed in an external terminal, and a projection part is further provided on a lead. The projection part of the lead is fitted into the through hole of the external terminal to allow connection between the external terminal and the lead.

The external terminal and the lead may be fixed by caulking, or laser-welded.

The restraining member may be a restraining ring wound around the outer perimeter of a rising part of the container member, for example. Alternatively, the lead may serve as the restraining member.

Hereinafter, examples of materials for the positive electrode, the negative electrode, the separator, the electrolytic solution, the lead, the container member, the gasket, the external terminal, the restraining member, and the insulating member which can be used in the nonaqueous electrolyte battery as an example of the battery according to the first embodiment will be described in detail.

1) Positive Electrode

As the positive electrode active material, an oxide or sulfide may be used, for example. Examples of the oxide and sulfide include manganese dioxide ($MnO_2$), iron oxide, copper oxide, nickel oxide, lithium manganese composite oxides (e.g., $Li_xMn_2O_4$ or $Li_xMnO_2$), lithium nickel composite oxides (e.g., $Li_xNiO_2$), lithium cobalt composite oxides (e.g., $Li_xCoO_2$), lithium nickel cobalt composite oxides (e.g., $LiNi_{1-y}Co_yO_2$), lithium manganese cobalt composite oxides (e.g., $Li_xMn_yCo_{1-y}O_2$), lithium manganese nickel composite oxides having a spinel structure (e.g., $Li_xMn_{2-y}Ni_yO_4$), lithium phosphorus oxides having a olivine structure (e.g., $Li_xFePO_4$, $Li_xFe_{1-y}Mn_yPO_4$, and $Li_xCoPO_4$), iron sulfate [$Fe_2(SO_4)_3$], vanadium oxides (e.g., $V_2O_5$), and lithium nickel cobalt manganese composite oxides, which absorb lithium. In the above-described formula, $0<x\leq1$, and $0<y\leq1$. As the active material, one of these compounds may be used singly, or two or more of the compounds may be used in combination.

The binder is blended to bind the active material with the current collector: Examples of the binder include polytetrafluoroethylene (PTFE), polyvinylidene fluoride (PVdF), and a fluororubber.

The conductive agent is blended as necessary to improve the current-collection performance, and to suppress the contact resistance between the active material and current collector. Examples of the conductive agent include carbonaceous materials such as acetylene black, carbon black, and graphite.

In the positive electrode material layer, the contents of the positive electrode active material and binder are preferably 80% by mass to 98% by mass, and 2% by mass to 20% by mass, respectively.

When the binder content is 2% by mass or more, sufficient electrode strength can be achieved. When the binder content is 20% by mass or less, the content of the insulator in the electrode can be reduced, and thereby the internal resistance can be decreased.

When a conductive agent is added, the contents of the positive electrode active material, binder, and conductive agent are preferably 77% by mass to 95% by mass, 2% by mass to 20% by mass, and 3% by mass to 15% by mass, respectively. When the content of the conductive agent is 3% by mass or more, the above-described effects can be achieved. By setting the amount of the positive electrode conductive agent to 15% by mass or less, the decomposition of a nonaqueous electrolyte on the surface of the positive electrode conductive agent in high-temperature storage can be reduced.

The positive electrode current collector is preferably an aluminum foil or an aluminum alloy foil containing at least one element selected from Mg, Ti, Zn, Ni, Cr, Mn, Fe, Cu, and Si.

The positive electrode current collector is preferably united with the positive electrode current-collecting tab. Alternatively, the positive electrode current collector may be separate from the positive electrode current-collecting tab.

2) Negative Electrode

As the negative electrode active material, for example, metal oxide, metal nitride, alloys, or carbon, each of which is capable of absorbing and releasing lithium ions, can be used. It is preferable to use a material capable of absorbing and releasing lithium ions at a potential of 0.4 V or higher (with respect to $Li/Li^+$) as the negative electrode active material.

The conductive agent is blended to improve current collection performance and to suppress the contact resistance between the negative electrode active material and the current collector. Examples of the conductive agent include carbonaceous materials such as acetylene black, carbon black, and graphite.

The binder is blended to fill gaps of the dispersed negative electrode active materials and also to bind the negative electrode active material with the current collector. Examples of the binder include polytetrafluoroethylene (PTFE), polyvinylidene fluoride (PVdF), fluororubber, and styrene-butadiene rubber.

The contents of the active material, conductive agent and binder in the negative electrode material layer are preferably 68% by mass to 96% by mass, 2% by mass to 30% by mass, and 2% by mass to 30% by mass, respectively. When the content of the conductive agent is 2% by mass or more, the current collection performance of the negative electrode layer can be improved. When the content of the binder is 2% by mass or more, binding between the negative electrode layer and current collector can be sufficiently achieved, and excellent cycling characteristics can be expected. On the other hand, the contents of the conductive agent and binder are preferably 28% by mass or less respectively, thereby increasing the capacity.

As the current collector, a material is used which is electrochemically stable at the absorption and release potentials of lithium as the negative electrode active material. The current collector is preferably made of copper, nickel, stainless steel or aluminum, or an aluminum alloy containing at least one element selected from Mg, Ti, Zn, Mn, Fe, Cu, and Si. The thickness of the current collector is preferably 5 to 20 µm. The current collector having such thickness can keep a balance between the strength and weight reduction of the negative electrode.

The negative electrode current collector is preferably united with a negative electrode current-collecting tab. Alternatively, the negative electrode current collector may be separate from a negative electrode current-collecting tab.

The negative electrode is produced by, for example, suspending a negative electrode active material, a binder, and a conductive agent in an ordinary solvent to prepare a slurry, applying the slurry to a current collector, drying the coating to form a negative electrode material layer, and then pressing the layer. The negative electrode may be produced by forming a negative electrode active material, a binder, and a conductive agent in pellets to produce a negative electrode material layer, and placing it on a current collector.

3) Separator

The separator may be formed from a porous film containing, for example, polyethylene, polypropylene, cellulose, or polyvinylidene fluoride (PVdF) or nonwoven fabric made of a synthetic resin. Among these, a porous film containing polyethylene or polypropylene can improve safety because the porous film melts at a predetermined temperature to be able to shut off current.

4) Electrolytic Solution

As the electrolytic solution, for example, a nonaqueous electrolyte can be used.

The nonaqueous electrolyte may be, for example, a liquid nonaqueous electrolyte prepared by dissolving an electrolyte in an organic solvent or a gel nonaqueous electrolyte in which a liquid electrolyte and a polymeric material are compounded.

The liquid nonaqueous electrolyte is preferably prepared by dissolving an electrolyte in an organic solvent in the concentration of 0.5 mol/L to 2.5 mol/L.

Examples of the electrolyte to be dissolved in an organic solvent include lithium salts such as lithium perchlorate ($LiClO_4$), lithium hexafluorophosphate ($LiPF_6$), lithium tetrafluoroborate ($LiBF_4$), lithium hexafluoroarsenide ($LiAsF_6$), lithium trifluoromethanesulfonate ($LiCF_3SO_3$) and lithium bistrifluoromethylsulfonylimide [$LiN(CF_3SO_2)_2$], and mixtures thereof. The electrolyte preferably resists oxidizing even at a high potential, and $LiPF_6$ is most preferable.

Examples of the organic solvent include cyclic carbonates such as propylene carbonate (PC), ethylene carbonate (EC), and vinylene carbonate; chain carbonates such as diethyl carbonate (DEC), dimethyl carbonate (DMC), and methyl ethyl carbonate (MEC); cyclic ethers such as tetrahydrofuran (THF), 2-methyl tetrahydrofuran (2MeTHF), and dioxolane (DOX); chain ethers such as dimethoxy ethane (DME) and diethoxy ethane (DEE); γ-butyrolactone (GBL), acetonitrile (AN), and sulfolane (SL). One of these organic solvents can be used alone or a mixed solvent can be used.

Examples of the polymeric material include polyvinylidene fluoride (PVdF), polyacrylonitrile (PAN), and polyethylene oxide (PEO).

Alternatively, the nonaqueous electrolyte may be, for example, an ordinary-temperature molten salt (ionic melt) containing lithium ions, a polymer solid electrolyte, or an inorganic solid electrolyte.

The ordinary-temperature molten salt (ionic melt) means a compound which is an organic salt containing an organic cation and an organic anion, and can exist alone as a liquid at ordinary temperature (15 to 25° C.). The ordinary-temperature molten salt includes an ordinary-temperature molten salt which exists alone as a liquid, an ordinary-temperature molten salt which becomes a liquid after being mixed with an electrolyte, and an ordinary-temperature molten salt which becomes a liquid after being dissolved in an organic solvent. In general, the melting point of the ordinary-temperature molten salt used in nonaqueous electrolyte batteries is 25° C. or below. The organic cations generally have a quaternary ammonium skeleton.

5) Lead

As a material for the lead, for example, an aluminum material or an aluminum alloy material can be used. The material for the lead is preferably the same as the material for the positive electrode current collector or negative electrode current collector which can electrically be connected to the lead in order to reduce contact resistance.

6) Container Member

The container member is preferably made of a material having corrosion resistance. The container member can be formed from a metal, an alloy or a laminate of a resin layer and a metal layer and/or an alloy layer, as described above.

Examples of the metal and alloy which can form the container member include aluminum, an aluminum alloy, or stainless steel. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

As the resin layer included in the laminate, for example, a resin layer made of a thermoplastic resin such as polypropylene (PP) or polyethylene (PE) can be used.

6) Gasket

Examples of a material which can form the gasket include resins such as a fluorine resin, a fluorine rubber, a polyphenylene sulfide resin (PPS resin), a polyether ether ketone resin (PEEK resin), a polypropylene resin (PP resin), and a polybutyrene terephthalate resin (PBT resin).

7) External Terminal

As a material for the external terminal, for example, the same material as that of the lead can be used.

8) Restraining Member

As a material for the restraining member, for example, aluminum, an aluminum alloy, or a stainless steel material can be used.

Since the restraining member may constitute a single member together with the lead as described above, the restraining member may be made of the same material as that of the lead.

9) Insulating Member

As a material for the insulating member, for example, thermoplastic resins such as a tetrafluoroethylene-perfluoroalkyl vinyl ether copolymer (PFA), polypropylene (PP), polyethylene (PE), nylon, polybutylene terephthalate (PBT), polyethylene terephthalate (PET), polytetrafluoroethylene (PTFE), polyphenylene sulfide (PPS), and polyether ether ketone (PEEK) can be used.

10) Other Members

The battery according to the first embodiment can also include members other than the members described above.

For example, the battery according to the first embodiment can include a sandwiching member for bundling a positive electrode current-collecting tab or a negative electrode current-collecting tab. The sandwiching member can be made of the same material as that of the bundled positive electrode current-collecting tab or negative electrode current-collecting tab, i.e., that of the positive electrode current collector or negative electrode current collector, for example.

Next, an example of the battery according to the first embodiment will be described in detail with reference to the drawings.

First, a battery as a first example according to the first embodiment will be described with reference to FIGS. 1 to 5.

Figure 4:
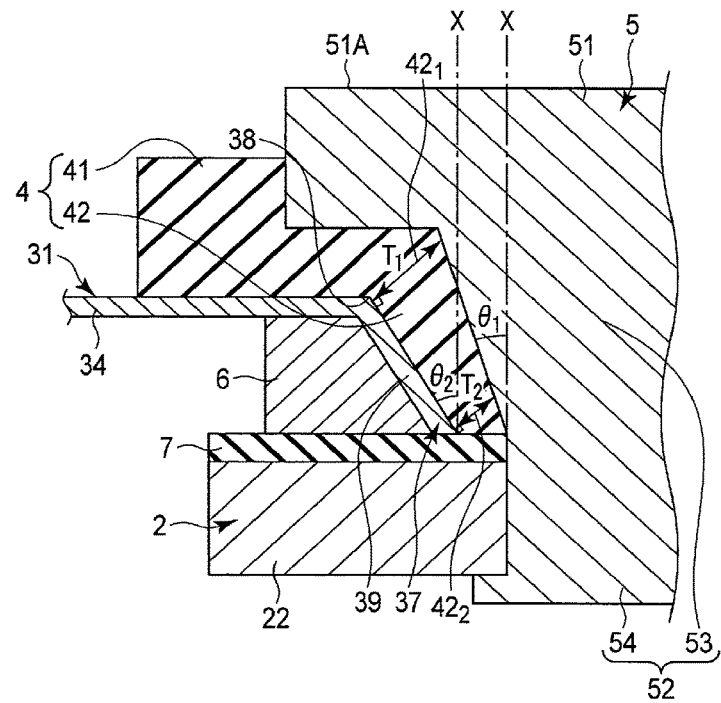
FIG. 4 is an enlarged view of a portion IV of FIG. 3.
Figure 5:
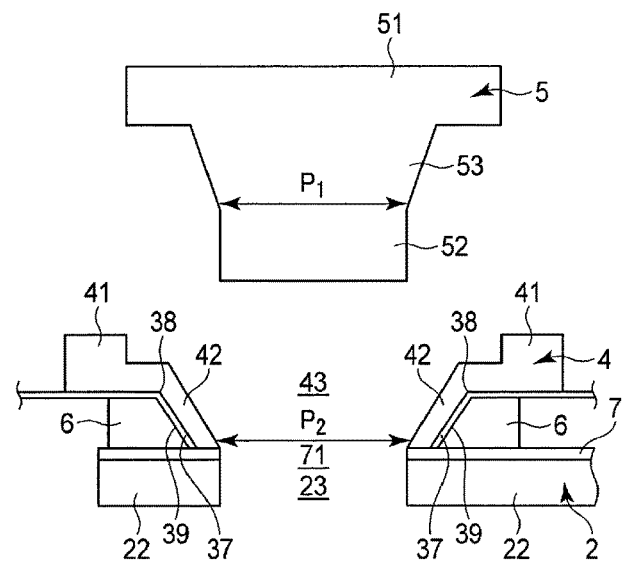
FIG. 5 is a schematic sectional view showing a state before the positive electrode terminal is incorporated in an example of a production process of the battery as the first example.

FIG. 1 is a schematic perspective view of a battery as the first example according to the first embodiment. FIG. 2 is a schematic exploded perspective view of an end part including a positive electrode terminal of the battery as the first example. FIG. 3 is a schematic sectional view taken along line segment III-III' of the battery shown in FIG. 1. FIG. 4 is an enlarged view of a portion IV of FIG. 3. FIG. 5 is a schematic sectional view showing a state before the positive electrode terminal is incorporated in an example of a production process of the battery as the first example.

A battery 100 as the first example shown in FIGS. 1 to 4 is a nonaqueous electrolyte battery.

The battery 100 as the first example shown in FIGS. 1 to 4 includes an electrode body 1 shown in FIG. 2, a lead 2 shown in FIGS. 2 to 4, a container member 3 shown in FIGS. 1 to 4, a gasket 4 shown in FIGS. 1 to 4, two external terminals 5 shown in FIGS. 1 to 4, and a restraining ring 6 as a restraining member shown in FIGS. 2 to 4.

The electrode body 1 shown in FIG. 2 includes a positive electrode, a negative electrode, and a separator which are not shown. The positive electrode includes a belt-like positive electrode current collector, a positive electrode material layer formed thereon, and a positive electrode current-collecting tab. The negative electrode includes a belt-like negative electrode current collector, a negative electrode material layer formed thereon, and a negative electrode current-collecting tab.

The electrode body 1 is obtained by laminating a positive electrode, a negative electrode, and a separator so that a positive electrode material layer and a negative electrode material layer are disposed to be opposed to each other with the separator sandwiched therebetween, and coiling the laminate thus obtained. When the laminate is produced, the positions of the positive electrode and negative electrode are adjusted so that the positive electrode current-collecting tab and the negative electrode current-collecting tab extend in opposite directions to each other from the coiled laminate.

The electrode body 1 further includes a sandwiching part 11 sandwiching the positive electrode current-collecting tab extending from the coiled laminate, a sandwiching part (not shown) sandwiching the negative electrode current-collecting tab extending from the coiled laminate, and an insulating seal 12 covering a portion other than the positive electrode current-collecting tab and the negative electrode current-collecting tab in the coiled laminate.

The battery 100 as the first example includes two leads 2. In FIGS. 2 to 4, only the positive electrode lead 2 of the two leads 2 included in the battery 100 as this example is shown.

As shown in FIG. 2, the positive electrode lead 2 includes an electrode-connecting part 21 and a terminal-connecting part 22. The electrode connecting part 21 has a belt-like plane shape. While FIG. 2 shows an exploded view, the electrode-connecting part 21 of the positive electrode lead 2 is ultrasonically welded to the sandwiching part 11 sandwiching the positive electrode current-collecting tab of the electrode body 1. The terminal-connecting part 22 is a plate-like member having a strip plane shape, and has a through hole 23.

Although not shown in the drawings, the negative electrode lead which is the other lead of the two leads 2 included in the battery 100 as this example includes the same electrode-connecting part and terminal-connecting part as those of the positive electrode lead 2 shown in FIG. 2. The electrode connecting part is ultrasonically welded to the sandwiching part sandwiching the negative electrode current-collecting tab of the electrode body 1.

The electrode body 1 and the two leads 2 are housed in the container member 3, as shown in FIG. 2.

The container member 3 includes a container body 31 and a sealing plate 32 opposed to the container body 31, as shown in FIG. 2. Both the container body 31 and the sealing plate 32 are formed from a laminate film which includes an aluminum foil, an aluminum alloy foil or a stainless steel foil, and a resin film and has a thickness of 0.3 mm or less.

As shown in FIGS. 1 and 2, the container body 31 includes a main part 33 having a main surface 33A, two terminal-connecting parts 34 having a terminal-connecting surface 34A and having a thickness of 0.3 mm or less, and a peripheral part 35 having a main surface 35A. The main surface 33A of the main part 33, the terminal-connecting surface 34A of the terminal-connecting part 34, and the main surface 35A of the peripheral part 35 are not on the same plane. The main part 33 and the terminal-connecting part 34 form a recessed part that spreads with increasing distance from the sealing plate 32. The container body 31 having such a structure can be formed by subjecting the laminate film to shallow drawing.

The peripheral part 35 of the container body 31 is joined to the sealing plate 32 by heat sealing in a state where the recessed part of the main part 33 of the container body 31 houses the electrode body 1, and each of two recessed parts of the terminal connecting part 34 houses each of the two leads 2. The joining can also be performed by laser welding or the like, for example, in place of heat sealing. Thereby, the electrode body 1 and the lead 2 are housed in the container member 3 including the container body 31 and the sealing plate 32.

Now, as shown in FIG. 2, the terminal-connecting part 34 of the container body 31 has a through hole 36. The through hole 36 passes through the terminal-connecting part 34. Furthermore, as shown in FIGS. 3 and 4, the terminal-connecting part 34 includes a rising part 37 extending into the container member 3 from an edge part 38 of the through hole 36. The rising part 37 includes a diameter-reduction part 39 which has a diameter reduced along a direction toward the inside of the container member 3 from the edge part 38 of the through hole 36 and has a taper surface.

Although not shown in the drawings, the container member 3 is provided with a liquid inlet for injecting a nonaqueous electrolyte. The container body 31 and the sealing plate 32 are joined to each other to form the container member 3, and the nonaqueous electrolyte is then injected via the liquid inlet. Thereby, the container member 3 can further house the nonaqueous electrolyte with which the electrode body 1 is impregnated. After the nonaqueous electrolyte is injected, the liquid inlet is sealed by laser welding, for example.

The gasket 4 shown in FIGS. 1 to 4 includes a flange part 41 and a shaft 42. As shown in FIGS. 3 and 4, the shaft 42 extends from the flange part 41. The shaft 42 has a through hole 43 extending to a direction in which the shaft 42 extends, and is hollow.

As shown in FIGS. 2 to 4, the flange part 41 of the gasket 4 is mounted on the terminal-connecting surface 34A of the container body 31. The shaft 42 of the gasket 4 is inserted into the through hole 36 of the rising part 37 of the container body 31. Therefore, as shown in FIGS. 3 to 5, the taper surface of the diameter-reduction part 39 of the rising part 37 is reflected on the inner surface of the through hole 43 of the shaft 42 of the gasket 4.

As shown in FIGS. 3 and 4, an end part 37A of the rising part 37 of the container member 3 and an end part 42A of the shaft 42 of the gasket 4 are disposed to be opposed to the terminal-connecting part 22 of the positive electrode lead 2. As shown in FIGS. 2 to 4, an insulating sheet 7 is disposed between the end part 37A of the rising part 37 and the terminal-connecting part 22 of the positive electrode lead 2 and between the end part 42A of the shaft 42 of the gasket 4 and the terminal-connecting part 22 of the positive electrode lead 2. The insulating sheet 7 has a through hole 71, as shown in FIG. 2. The insulating sheet 7 is disposed so that one edge part of the through hole 71 is in contact with the edge part of the through hole 43 of the shaft 42 of the gasket 4, and the other edge part of the through hole 71 is in contact with the edge part of the through hole 23 of the terminal-connecting part 22 of the lead 2.

The battery 100 as the first example includes two external terminals, i.e., a positive electrode terminal 5 and a negative electrode terminal 5'. Only the positive electrode terminal 5 is shown in FIGS. 2 to 4.

The positive electrode terminal 5 includes a flange part 51 and a terminal shaft 52. The flange part 51 includes a main surface 51A. The terminal shaft 52 extends from the flange part 51 as the first end part in a direction perpendicular to the main surface 51A of the flange part 51, i.e., an axial direction X shown in FIG. 4. The terminal shaft 52 includes a diameter-reduction part 53 having a diameter that reduces with increasing distance from the flange part 51, and having a taper surface.

As shown in FIGS. 3 and 4, the flange part 51 of the positive electrode terminal 5 is mounted on the flange part 41 of the gasket 4. The terminal shaft 52 of the positive electrode terminal 5 is disposed so as to pass through the through hole 43 of the gasket 4, the through hole 71 of the insulating sheet 7, and the through hole 23 of the positive electrode lead 2 in order. Herein, a part of the diameter-reduction part 53 of the positive electrode terminal 5 is in contact with the inner periphery of the through hole 43 of the gasket 4.

As shown in FIGS. 3 and 4, a tip 54 of the terminal shaft 52 passing through the through hole 23 of the positive electrode lead 2 is fixed to the terminal-connecting part 22 of the positive electrode lead 2 by caulking, to form a caulked part 54 as the second end part of the terminal shaft 52. Such a caulking fixing can be performed before the peripheral part 35 of the container body 31 and the sealing plate 32 are joined to each other.

By the above constitution, as shown in FIGS. 3 and 4, a part of the diameter-reduction part 53 of the terminal shaft 52 is surrounded by the shaft 42 of the gasket 4, and the outside of the shaft 42 of the gasket 4 is further surrounded by the rising part 37.

Furthermore, the restraining ring 6 included in the battery 100 as the first example restrains the rising part 37 surrounding the part of the diameter-reduction part 53 of the terminal shaft 52 and the shaft 42 of the gasket 4.

Now, as described above, the terminal shaft 52 of the positive electrode terminal 5 includes the diameter-reduction part 53 having the taper surface. As shown in FIG. 4, the taper surface is inclined by an inclination angle $\theta_1$ with respect to the axial direction X of the terminal shaft 52 of the positive electrode terminal 5. As described above, the rising part 37 of the container member 3 also includes the diameter-reduction part 39 having the taper surface. As shown in FIG. 4, the taper surface is inclined by an inclination angle $\theta_2$ with respect to the axial direction X of the terminal shaft 52 of the positive electrode terminal 5. Herein, the inclination angle $\theta_2$ of the diameter-reduction part 39 of the rising part 37 is larger than the inclination angle $\theta_1$ of the diameter-reduction part 53 of the terminal shaft 52. That is, the taper of the diameter-reduction part 39 of the rising part 37 is gentler than the taper of the diameter-reduction part 53 of the terminal shaft 52.

The shaft 42 of the gasket 4 sandwiched between the diameter-reduction part 53 of the terminal shaft 52 and the diameter-reduction part 39 of the rising part 37 which have taper surfaces having different angles of inclination as described above is subjected to pressure from the diameter-reduction part 53 of the terminal shaft 52 and the diameter-reduction part 39 of the rising part 37 as described later with reference to FIG. 5.

FIG. 5 is a schematic sectional view showing a state before the positive electrode terminal is incorporated in a production process as an example of the battery as the first example.

As described above, the shaft 42 of the gasket 4 is inserted into the rising part 37 of the container body 31 as shown in FIG. 5. Since the rising part 37 includes the diameter reduction part 39 described above, the peripheral surface of the through hole 43 of the shaft 42 of the gasket 4 inserted into the rising part 37 includes the taper surface on which the taper of the diameter-reduction part 39 of the rising part 37 is reflected.

As described above, the diameter-reduction part 53 of the terminal shaft 52 of the positive electrode terminal 5 is inserted into the through hole 43 of the gasket 4 so that a part of the diameter-reduction part 53 is brought into contact with the inner periphery of the through hole 43 of the gasket 4. Therefore, the positive electrode terminal 5 is designed so that the outer diameter of at least a part of the diameter-reduction part 53 of the terminal shaft 52 is equal to or more than the inner diameter of at least a part of the through hole 43 of the gasket 4. Since the inclination angle $\theta_2$ of the diameter-reduction part 39 of the rising part 37 is reflected on the inclination angle of the inner periphery of the through hole 43 of the gasket 4 before the terminal shaft 52 of the positive electrode terminal 5 is inserted, the inclination angle of the inner periphery of the through hole 43 of the gasket 4 is lower than the inclination angle $\theta_1$ of the diameter reduction part 53 of the terminal shaft 52. Therefore, the shaft 42 of the gasket 4 includes a portion the inner diameter $P_2$ of the through hole 43 of which is smaller than the outer diameter $P_1$ of at least a part of the diameter-reduction part 53 of the terminal shaft 52 before the terminal shaft 52 is inserted as shown in FIG. 5.

By inserting the terminal shaft 52 of the positive electrode terminal 5 into the through hole 43 of the gasket 4, a portion in which the inner diameter of the through hole 43 is smaller than the outer diameter of the diameter-reduction part 53 of the terminal shaft 52 in the shaft 42 of the gasket 4 is subjected to pressure from the diameter-reduction part 53 of the positive electrode terminal 5. Simultaneously, this portion of the shaft 42 of the gasket 4 is subjected to pressure also from the diameter-reduction part 39 of the rising part 37.

A portion subjected to pressure from the diameter-reduction part 53 of the terminal shaft 52 of the positive electrode terminal 5 in the shaft 42 of the gasket 4 is subjected to a restraining force from the restraining ring 6 via the diameter-reduction part 39 of the rising part 37 as a counteraction of pressure from the diameter-reduction part 53 of the terminal shaft 52.

Therefore, the battery 100 as the first example shown in FIGS. 1 to 4 can achieve high tightness of contact between the diameter-reduction part 53 of the terminal shaft 52 of the positive electrode terminal 5 and the shaft 42 of the gasket 4, and of contact between the diameter-reduction part 39 of the rising part 37 and the shaft 42 of the gasket 4, and eventually can achieve high sealing performance.

In the battery 100 as the first example, as shown in FIG. 4, the shaft 42 of the gasket 4 includes a first portion $42_1$ having a maximum thickness $T_1$ and a second portion $42_2$ having a maximum thickness $T_2$ in a portion sandwiched between the diameter-reduction part 39 of the rising part 37 and the diameter-reduction part 53 of the terminal shaft 52. As shown in FIG. 4, the first portion $42_1$ corresponds to a root portion located on the side of the flange part 41 of the shaft 42 of the gasket 4. The second portion $42_2$ corresponds to the tip part of the shaft 42 close to insulating sheet 7. That is, the first portion $42_1$ is disposed closer to an edge part 38 of the through hole (although not shown in FIG. 4, reference mark 36 is attached in FIG. 2) of the terminal-connecting part 34 than the second portion $42_2$. The second portion $42_2$ having a thickness smaller than that of the first portion $42_1$ means that the second portion $42_2$ is compressed by pressure from the diameter-reduction part 39 of the rising part 37 and the diameter-reduction part 53 of the terminal shaft 52.

Although the positive electrode terminal 5 has been described above, the negative electrode terminal 5' included in the battery 100 as the first example shown in FIGS. 1 to 4 also has the same structure and arrangement as those of the positive electrode terminal 5. Therefore, the battery 100 as the first example shown in FIGS. 1 to 4 can achieve high sealing performance also in the negative electrode terminal 5'.

The battery 100 as the first example shown in FIGS. 1 to 4 is the nonaqueous electrolyte battery, as described above. Since the battery 100 as the first example can exhibit high sealing performance, the battery 100 can prevent the leakage of a nonaqueous electrolyte and the infiltration of moisture, or the like. Because of this, the battery 100 as the first example can prevent problems such as deterioration in battery performance, for example.

Furthermore, in the battery 100 as the first example shown in FIGS. 1 to 4, as shown in FIGS. 3 and 4, the rising part 37 extends with the diameter thereof reduced toward the inside of the container member 3. When the pressure inside the container member 3 is increased, the rising part 37 may be deformed so that each of the terminal shafts 52 (one is not shown) of the external terminals 5 and 5' surrounded by the rising part 37 is tightened. That is, the battery 100 as the first example can maintain high sealing performance even if the internal pressure of the battery 100 is increased.

Next, a battery as a second example according to the first embodiment will be described with reference to FIGS. 6 to 8.

Figure 6:
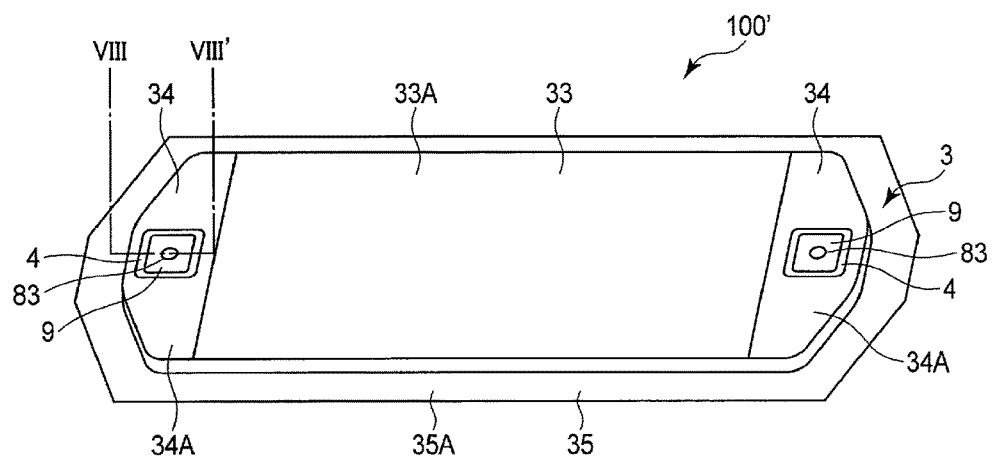
FIG. 6 is a schematic perspective view of a battery as a second example according to the first embodiment.

FIG. 6 is a schematic perspective view of a battery as a second example according to the first embodiment. FIG. 7 is a schematic exploded perspective view of an end part including a positive electrode terminal of the battery as the second example. FIG. 8 is a schematic sectional view taken along line segment VIII-VIII' of the battery shown in FIG. 6.

Figure 8:
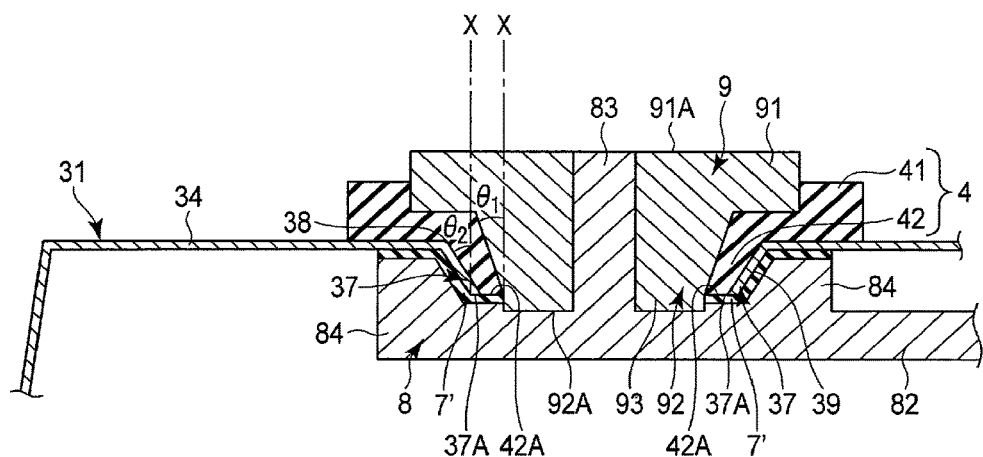
FIG. 8 is a schematic sectional view taken along line segment VIII-VIII' of the battery shown in FIG. 6.

A battery 100' as the second example shown in FIGS. 6 to 8 is a nonaqueous electrolyte battery.

The battery 100' as the second example shown in FIGS. 6 to 8 includes an electrode body 1 shown in FIG. 7, a lead 8 shown in FIGS. 7 to 8, a container member 3 shown in FIGS. 6 to 8, a gasket 4 shown in FIGS. 6 to 8, and two external terminals 9 and 9' shown in FIGS. 6 to 8.

The electrode body 1 shown in FIG. 7, the container member 3 shown in FIGS. 6 to 8, and the gasket 4 shown in FIGS. 6 to 8 are respectively the same as the electrode body 1, container member 3, and gasket 4 included in the battery 100 as the first example shown in FIGS. 1 to 4. Therefore, herein, the descriptions thereof are omitted.

The battery 100' as the second example includes two leads 8. In FIGS. 7 to 8, only a positive electrode lead 8 of the two leads 8 included in the battery 100' as this example is shown.

As shown in FIG. 7, the positive electrode lead 8 includes an electrode-connecting part 81 and a terminal-connecting part 82. The electrode-connecting part 81 has a belt-like plane shape. FIG. 7 shows an exploded view, and the electrode-connecting part 81 of the positive electrode lead 8 is ultrasonically welded to a sandwiching part 11 sandwiching a positive electrode tab of the electrode body 1. As shown in FIG. 7, the terminal-connecting part 82 is a plate-like member having a strip plane shape, and includes a main surface on which a rod-like connecting projection 83 is provided. The terminal connecting part 82 further includes a restraining projection 84. The restraining projection 84 has a ring-like plane shape. The ring centers on the connecting projection 83.

Although not shown in the drawings, a negative electrode lead which is the other lead of the two leads 8 included in the battery 100' as this example includes the same electrode-connecting part and terminal-connecting part as those of the positive electrode lead 8 shown in FIG. 7. The electrode-connecting part is ultrasonically welded to a sandwiching part sandwiching a negative electrode tab of the electrode body 1.

The electrode body 1 and the two leads 8 are housed in the container member 3, as shown in FIG. 7.

As with the battery 100 as the first example, also in the battery 100' as the second example, a peripheral part 35 of a container body 31 is heat-sealed to a sealing plate 32 in a state where a recessed part of a main part 33 of the container body 31 houses the electrode body 1, and each of two recessed parts of a terminal-connecting part 34 houses each of the leads 8. Thereby, the electrode body 1 and the leads 8 are housed in the container member 3 including the container body 31 and the sealing plate 32. In the battery 100' as the second example, as with the battery 100 as the first example, a nonaqueous electrolyte with which is the electrode body 1 is impregnated is also housed in the container member 3.

As with the battery 100 as the first example, also in the battery 100' as the second example, a flange part 41 of the gasket 4 is mounted on a terminal-connecting surface 34A of the container body 31. The shaft 42 of the gasket is inserted into the through hole 36 of the rising part 37 of the container body 31. Therefore, as shown in FIG. 8, the taper surface of a diameter-reduction part 39 of the rising part 37 is reflected on the inner surface of a through hole 43 of the shaft 42 of the gasket 4.

Herein, as shown in FIG. 8, an end part 42A of the shaft 42 of the gasket 4 and an end part 37A of the rising part 37 are disposed to be opposed to the positive electrode lead 8. The end part 42A of the shaft 42 of the gasket 4 is in contact with the terminal-connecting part 82 of the positive electrode lead 8. On the other hand, as shown in FIG. 8, the end part 37A of the rising part 37 is opposed to the terminal connecting part 82 of the positive electrode lead 8 with an insulating ring 7' sandwiched therebetween. The rising part 37 is opposed to the restraining projection 84 of the positive electrode lead 8 with the insulating ring 7' sandwiched therebetween. As shown in FIG. 8, the insulating ring 7' is sandwiched between the rising part 37 of the terminal connecting part 34 and the restraining projection 84 of the positive electrode lead 8. Thereby, a portion be in contact with the rising part 37 of the terminal connecting part 34 is deformed by the surface shape of the rising part 37. On the other hand, a portion be in contact with the restraining projection 84 of the positive electrode lead 8 is deformed by the surface shape of the restraining projection 84.

Now, the battery 100' as the second example shown in FIGS. 6 to 8 includes two external terminals, i.e., a positive electrode terminal 9 and a negative electrode terminal 9'. Only the positive electrode terminal 9 is shown in FIGS. 7 and 8.

As shown in FIG. 8, the positive electrode terminal 9 includes a flange part 91 and a terminal shaft 92. The flange part 91 includes a main surface 91A. The terminal shaft 92 extends from the flange part 91 as a first end part in a direction perpendicular to the main surface 91A of the flange part 91, i.e., an axial direction X, and includes an axial end part 92A as a second end part. The terminal shaft 92 includes a diameter-reduction part 93 having a diameter reduced with increased distance from the flange part 91, and having a taper surface.

Furthermore, as shown in FIGS. 7 and 8, the positive electrode terminal 9 has a through hole 94 starting from the main surface 91A of the flange part 91 and arriving at an axial end part 92A of the terminal shaft 92.

As shown in FIG. 7, the flange part 91 of the positive electrode terminal 9 is mounted on the flange part 41 of the gasket 4. As shown in FIG. 8, the terminal shaft 92 of the positive electrode terminal 9 passes through the through hole 43 of the gasket 4. The axial end part 92A is in contact with the terminal connecting part 82 of the positive electrode lead 8. Furthermore, the connecting projection 83 of the positive electrode lead 8 is fitted into the through hole 94 of the positive electrode terminal 9. An end part of the connecting projection 83 of the positive electrode lead 8 is welded to the main surface 91A of the flange part 91 of the positive electrode terminal 9.

By the above constitution, as shown in FIG. 8, a part of the diameter reduction part 93 of the positive electrode terminal 9 is surrounded by the shaft 42 of the gasket 4, and the outside of the gasket 4 is further surrounded by the rising part 37.

As shown in FIG. 8, the rising part 37 surrounding the diameter reduction part 93 of the positive electrode terminal 9 and the shaft of the gasket 4 is further restrained by the restraining projection 84 provided on the positive electrode lead 8. That is, in the battery 100' as the second example, the positive electrode lead 8 serves as the same restraining member as the restraining ring 6 included in the battery 100 as the first example.

Now, as described above, the terminal shaft 92 of the positive electrode terminal 9 includes the diameter-reduction part 93 having the taper surface. As shown in FIG. 8, the taper surface is inclined by an inclination angle $\theta_1$ with respect to the axial direction X of the terminal shaft 92 of the positive electrode terminal 9. As described above, the rising part 37 of the container member 3 also includes the diameter-reduction part 39 having the taper surface. As shown in FIG. 8, the taper surface is inclined by an inclination angle $\theta_2$ with respect to the axial direction X of the terminal shaft 92 of the positive electrode terminal 9. Herein, the inclination angle $\theta_2$ of the diameter-reduction part 39 of the rising part 37 is larger than the inclination angle $\theta_1$ of the diameter-reduction part 93 of the terminal shaft 92 of the positive electrode terminal 9. That is, the taper of the diameter-reduction part 39 of the rising part 37 is gentler than the taper of the diameter-reduction part 93 of the positive electrode terminal 9.

Thus, the shaft 42 of the gasket 4 sandwiched between the diameter-reduction part 93 of the terminal shaft 92 and the diameter-reduction part 39 of the rising part 37 which have taper surfaces having different angles of inclination is subjected to pressure from the diameter-reduction part 93 of the terminal shaft 92 and the diameter-reduction part 39 of the rising part 37, for the same reason as the reason described for the battery 100 as the first example. The shaft 42 of the gasket 4 in the battery 100' as the second example is subjected to a restraining force from the restraining projection 84 as a counteraction of pressure from the diameter-reduction part 93 of the terminal shaft 92 via the diameter-reduction part 39 of the rising part 37, as with the shaft 42 of the gasket 4 in the battery 100 as the first example. Therefore, the battery 100' as the second example can achieve high sealing performance for the same reason as that of the battery 100 as the first example.

The battery 100' as the second example shown in FIGS. 6 to 8 is the nonaqueous electrolyte battery, as described above. Since the battery 100' as the second example can exhibit high sealing performance, the battery 100' can prevent the leakage of a nonaqueous electrolyte and the infiltration of moisture, or the like. Because of this, the battery 100' as the second example can prevent problems such as deterioration in battery performance, for example.

Furthermore, in the battery 100' as the second example shown in FIGS. 6 to 8, as shown in FIG. 8, the rising part 37 extends with the diameter reduced toward the inside of the container member 3. When the pressure inside the container member 3 is increased, the rising part 37 may be deformed so that each of the terminal shafts 92 (one is not shown) of the external terminals 9 and 9' surrounded by the rising part 37 is tightened. That is, the battery 100' as the second example can maintain high sealing performance even if the internal pressure of the battery 100' is increased.

Figure 9:
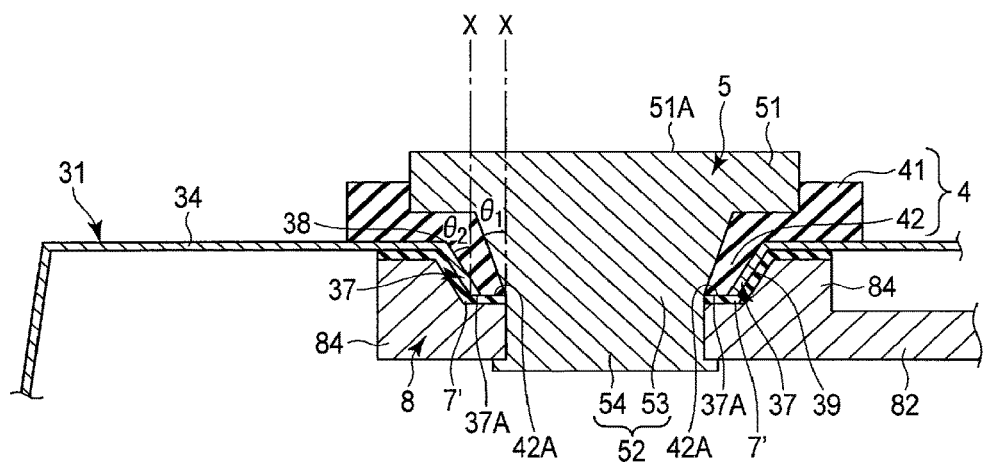
FIG. 9 is a schematic sectional view of a variant example of the battery as the second example.

Of course, as shown in FIG. 9, the positive electrode lead 2 and restraining ring 6 of the battery 100 as the first example shown in FIGS. 1 to 4 can also be changed to the same positive electrode lead 8 as the positive electrode lead 8 shown in FIG. 8. However, in this case, the positive electrode lead 8 includes the restraining projection 84, as shown in FIG. 9, but the positive electrode lead 8 includes no connecting projection.

Next, a battery as a third example according to the first embodiment will be described with reference to FIG. 10.

Figure 10:
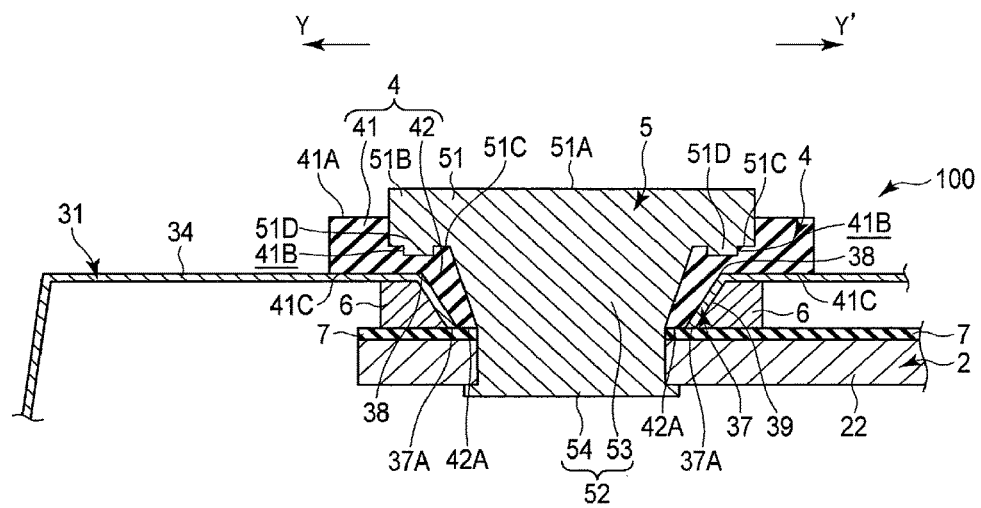
FIG. 10 is a schematic sectional view of an end part including a positive electrode terminal of a battery as a third example according to the first embodiment.

FIG. 10 is a schematic sectional view of an end part including a positive electrode terminal of a battery as a third example according to the first embodiment.

A battery 100 as the third example shown in FIG. 10 is a nonaqueous electrolyte battery. The battery 100 as the third example shown in FIG. 10 includes an electrode body which is not shown, two leads 2 (one is not shown), an container member 3, a gasket 4, two external terminals 5 (one is not shown), a restraining ring 6, and an insulating sheet 7.

The battery 100 as the third example includes the two external terminals 5, i.e., a positive electrode terminal, and a negative electrode terminal. FIG. 10 shows only the positive electrode terminal 5. However, the negative electrode terminal which is not shown also has the same structure as that of the positive electrode terminal 5 shown in FIG. 10, and is included in the battery 100 in the same arrangement.

The electrode body which is not shown, the leads 2, the container member 3, the restraining ring 6, and the insulating sheet 7 are respectively the same as the electrode body 1, leads 2, container member 3, restraining ring 6, and insulating sheet 7 which are included in the battery 100 as the first example shown in FIGS. 1 to 4. Therefore, herein, the descriptions thereof are omitted.

On the other hand, the gasket 4 included in the battery 100 as the third example shown in FIG. 10 is different from the gasket 4 included in the battery 100 as the first example shown in FIGS. 1 to 4 in the following respects. That is, the gasket 4 shown in FIG. 10 includes a main surface 41A in contact with the positive electrode terminal 5 and the main surface 41A is provided with a recessed part 41B which is a hollow part. The main surface of the gasket 4 including the recessed part 41B is a back surface of a mounting surface 41C of a flange part 41 of the gasket 4. The mounting surface 41C is in contact with a terminal-connecting part 34. The mounting surface 41C is in contact with an edge part 38 of a through hole (not shown in FIG. 10) of an container body 31. An shaft 42 of the gasket 4 extends toward the inside of the container member 3 from the mounting surface 41C of the gasket 4, as shown in FIG. 10.

The positive electrode terminal 5 included in the battery 100 as the third example shown in FIG. 10 is different from the positive electrode terminal 5 included in the battery 100 as the first example shown in FIGS. 1 to 4 in the following respects. That is, the positive electrode terminal 5 shown in FIG. 10 includes a projection 51D projected from a mounting surface 51C of a portion 51B of a flange part 51 mounted on the gasket 4. The mounting surface 51C is in contact with the gasket 4. The mounting surface 51C of the portion 51B of the flange part 51 is a back surface of a main surface 51A of the flange part 51 which is an end face of the portion 51B of the flange part 51, as shown in FIG. 10.

The recessed part 41B of the gasket 4 corresponds to the projection 51B of the positive electrode terminal 5. The projection 51B of the positive electrode terminal 5 is fitted into the recessed part 41B of the gasket 4.

Thus, the projection 51B of the positive electrode terminal 5 is fitted into the recessed part 41B of the gasket 4, and thereby the battery 100 as the third example can prevent the gasket 4 from moving in directions Y and Y' shown in FIG. 10 when the positive electrode terminal 5 is inserted into a through hole 43 of the gasket 4. That is, in the battery 100 as the third example, the shaft 42 of the gasket 4 can be held between a rising part 37 and a terminal shaft 52. As a result, the shaft 42 of the gasket 4 can be subjected to a stronger compressive force. That is, the battery 100 as the third example can include the terminal-connecting part having higher sealing performance.

Next, a battery as a fourth example according to the first embodiment will be described with reference to FIGS. 11 and 12.

Figure 11:
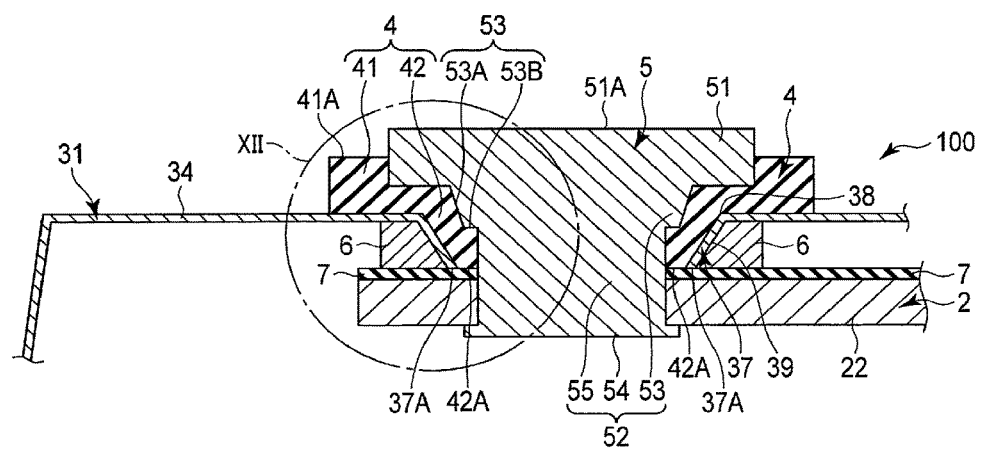
FIG. 11 is a schematic sectional view of an end part including a positive electrode terminal of a battery as a fourth example according to the first embodiment.

FIG. 11 is a schematic sectional view of an end part including a positive electrode terminal of a battery as a fourth example according to the first embodiment. FIG. 12 is an enlarged view of a part XII of FIG. 11.

Figure 12:
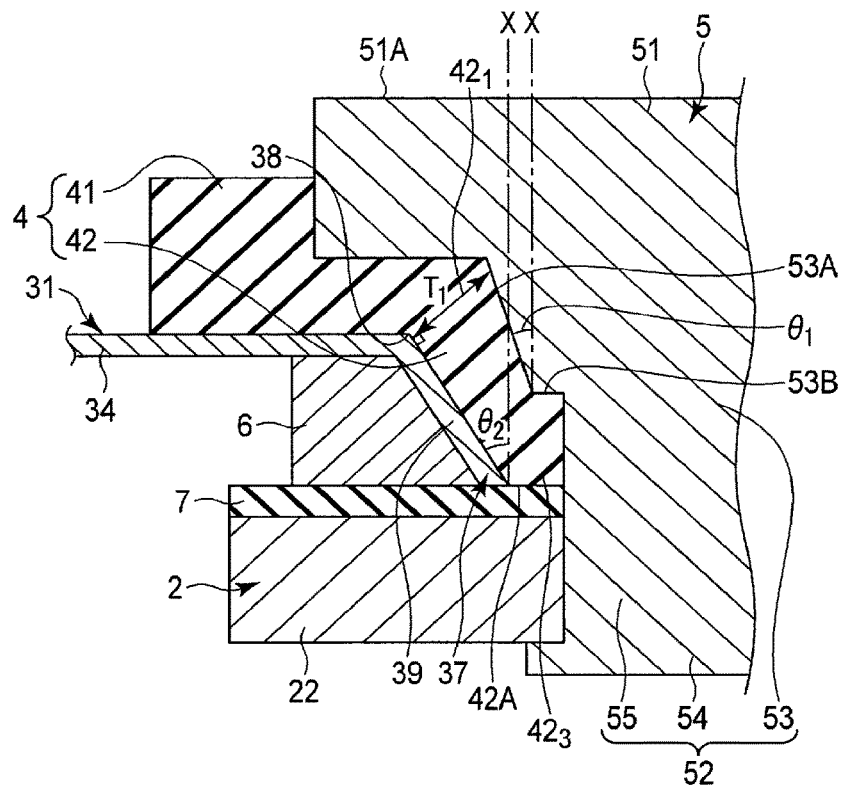
FIG. 12 is an enlarged view of a portion XII of FIG. 11.

A battery 100 as the fourth example shown in FIGS. 11 and 12 is a nonaqueous electrolyte battery. The battery 100 as the fourth example shown in FIGS. 11 and 12 includes an electrode body which is not shown, two leads 2 (one is not shown), a container member 3, a gasket 4, two external terminals 5 (one is not shown), a restraining ring 6, and an insulating sheet 7.

Although the battery 100 as the fourth example includes the two external terminals 5, i.e., a positive electrode terminal and a negative electrode terminal, FIGS. 11 and 12 show only the positive electrode terminal 5. However, the negative electrode terminal which is not shown also has the same structure as that of the positive electrode terminal 5 shown in FIGS. 11 and 12, and is included in the battery 100 in the same arrangement.

The electrode body which is not shown, the gasket 4, the leads 2, the container member 3, the restraining ring 6, and the insulating sheet 7 are respectively the same as the electrode body 1, leads 2, container member 3, restraining ring 6, and insulating sheet 7 which are included in the battery 100 as the first example shown in FIGS. 1 to 4. Therefore, herein, the descriptions thereof are omitted.

On the other hand, the positive electrode terminal 5 included in the battery 100 as the fourth example shown in FIGS. 11 and 12 is different from the positive electrode terminal 5 included in the battery 100 as the first example shown in FIGS. 1 to 5 in the following respects. That is, in the positive electrode terminal 5 shown in FIGS. 11 and 12, a diameter-reduction part 53 of a terminal shaft 52 includes a peripheral surface 53A including a step part 53B. Therefore, the terminal shaft 52 includes a portion 55 between the diameter-reduction part 53 and a caulked part 54. The portion 55 has a diameter smaller than the smallest diameter of the diameter-reduction part 53, i.e., that of the step part 53B of the diameter-reduction part 53.

By inserting the positive electrode terminal 5 into a through hole 43 of the gasket 4, the step part 53B of the diameter-reduction part 53 can strongly compress a third portion 42$_3$ including an end part 42A in an shaft 42 of the gasket 4 in an axial direction X of the terminal shaft 52 of the positive electrode terminal 5. The third portion 42$_3$ is located between the step part 53B of the positive electrode terminal 5 and a terminal-connecting part 22 of the lead 2. Since the end part 42A of the gasket 43 is strongly compressed, the battery 100 as the fourth example can improve tightness of contact between the gasket 4 and the container member 3, and tightness of contact between the gasket 4 and the positive electrode terminal 5 in a portion which can serve as a course for fluid. As a result, the battery 100 as the fourth example can have a terminal structure capable of exhibiting more excellent sealing performance in a terminal-connecting part 34 of the container member 3.

The battery according to the first embodiment described above includes a container member housing an electrode body and a lead, a gasket, an external terminal, and a restraining member. The container member includes a terminal-connecting part having a thickness of 0.3 mm or less. The terminal-connecting part has a through hole including a rising part. The gasket includes a hollow shaft inserted into the rising part. The external terminal includes a terminal shaft. The terminal shaft includes a diameter-reduction part. The restraining member restrains at least a part of the diameter-reduction part of the terminal shaft via the diameter-reduction part of the rising part and the shaft of the gasket. The inclination angle of the rising part is larger than the inclination angle of the terminal shaft. Such a battery can achieve high tightness of contact between the terminal shaft and the gasket and of contact between the rising part and the gasket, and eventually can exhibit high sealing performance. That is, in the battery according to the first embodiment, the terminal-connecting part having a small thickness can have the terminal structure capable of exhibiting high sealing performance.

Second Embodiment

According to a second embodiment, a seal unit is provided. The seal unit includes a seal member, a gasket, and a terminal. The seal member includes a first surface and a second surface as a back surface of the first surface. The seal member includes a rising part including a tip projected from the second surface, and a through hole passing through the seal member from the first surface to the tip of the rising part. The through hole includes a taper part having a diameter reduced that reduces with increasing proximity to the tip of the rising part. The gasket includes a through hole. The terminal includes a first end part and a second end part. The terminal includes a main part extending to an axial direction toward the second end part from the first end part. The main part includes a diameter-reduction part between the first end part and the second end part. The diameter-reduction part has a diameter that reduces with increasing proximity to the second end part. At least a part of the gasket is located in the taper part of the through hole of the seal member. At least a part of the diameter-reduction part of the terminal is located in the through hole of the gasket. At least a part located in the taper part of the through hole of the seal member in the gasket is sandwiched between the taper part of the seal member and the diameter-reduction part of the terminal. The inclination angle of the taper part of the seal member to the axial direction of the main part of the terminal is larger than the inclination angle of the diameter-reduction part to the axial direction.

The seal member in the seal unit according to the second embodiment corresponds to the container member of the battery according to the first embodiment. The taper part of the through hole of the seal member corresponds to the diameter-reduction part of the rising part of the container member in the battery according to the first embodiment. The terminal corresponds to the external terminal of the battery according to the first embodiment. The main part of the terminal corresponds to the terminal shaft of the external terminal in the battery according to the first embodiment.

Thus, in the seal unit according to the second embodiment, the at least a part of the gasket is sandwiched between the taper part of the seal member and the diameter-reduction part of the terminal, and the inclination angle of the taper part to the axial direction of the terminal is different from the inclination angle of the diameter-reduction part to the axial direction of the terminal. The portion of the gasket thus sandwiched is subjected to pressure from the diameter-reduction part of the terminal and the taper part of the seal member.

In particularly, since the inclination angle of the taper part of the seal member is larger than the inclination angle of the diameter-reduction part of the terminal, in the through hole passing through the portion of the gasket located in the through hole of the seal member, a portion close to the tip of the rising part of the seal member can include a portion having a diameter smaller than that of the diameter-reduction part of the terminal. Therefore, a portion located close to the tip of the rising part also in the portion of the gasket sandwiched between the taper part and the diameter-reduction part can be subjected to high pressure.

The portion of the gasket subjected to high pressure from the seal member and the terminal can apply a repulsive elastic force as a counteraction to the seal member and the terminal. Because of this, in the seal unit according to the second embodiment, tightness of contact between the seal member and the gasket and tightness of contact between the gasket and the terminal can be improved at a position close to the tip of the rising part of the seal member. As a result, the seal unit according to the second embodiment can exhibit excellent sealing performance in the portion including the terminal.

Since the portion of the gasket sandwiched between the taper part of the seal member and the diameter reduction part of the terminal is subjected to pressure from the taper part and the diameter reduction part as described above, the portion may be compressed. Particularly, since a portion located close to the tip of the rising part in the portion of the gasket sandwiched between the taper part and the diameter-reduction part can be subjected to high pressure, the portion may be largely compressed. On the other hand, a portion having the maximum thickness in the portion of the gasket sandwiched between the taper part and the diameter reduction part, i.e., a portion subjected to less pressure and having a small compression ratio, a portion not subjected to pressure and not compressed, or a portion expanded by elastic deformation caused by the compression of a part of the gasket may be disposed farther from the tip of the rising part of the seal member than a portion of the gasket having the minimum thickness, i.e., the portion subjected to large pressure and largely compressed. That is, when the portion having the maximum thickness in the portion of the gasket sandwiched between the taper part and the diameter-reduction part is defined as a first portion, and the portion having the minimum thickness in the portion of the gasket sandwiched between the taper part and the diameter-reduction part is defined as a second portion, the second portion may be disposed closer to the tip of the rising part of the seal member than the first portion.

The rising part of the seal member described above may have a thickness, i.e., a wall thickness of 0.3 mm or less. It may be difficult to subject a portion having a small thickness of, for example, 0.3 mm or less in a plate to deep drawing or the like because of the small thickness. Therefore, it may be difficult to provide the same terminal structure as that capable of being provided on a plate having a large thickness by deep drawing on a terminal-connecting part having a small thickness. However, according to the second embodiment, a terminal structure capable of exhibiting high sealing performance can be provided on the rising part of the seal member which may have a thickness of 0.3 mm or less. Because of this, both the weight saving and sealing performance of the battery can achieved.

In the seal unit according to the second embodiment, the seal member may not have a uniform thickness. For example, the seal member can also include a rising part having a first thickness, and a portion having a second thickness larger than the first thickness. The seal unit according to the second embodiment may be produced separately from the container member of the battery. Because of this, by combine the seal unit according to the second embodiment with a container member having a large wall thickness, and having high strength, a battery having high strength as a whole can also be provided.

The seal unit according to the second embodiment can further include a restraining member surrounding the rising part of the seal member. In the case of this aspect, the rising part may be sandwiched between at least a part of the gasket and the restraining member. The portion of the gasket sandwiching the rising part together with the restraining member is a portion sandwiched between the taper part of the seal member and the diameter-reduction part of the terminal.

In this aspect, pressure applied to the gasket from the diameter-reduction part of the terminal is transmitted to the rising part, and eventually the restraining member. The restraining member can transmit a counteraction against pressure from the diameter-reduction part of the terminal as a restraining force to the gasket through the rising part. Because of this, in the seal unit according to this aspect, a part of the gasket can be subjected to pressure from the diameter-reduction part of the terminal, and pressure and a restraining force from the rising part. As a result, the seal unit of this aspect can achieve even higher tightness of contact between the terminal and the gasket and of contact between the seal member and the gasket, and eventually can exhibit even higher sealing performance.

The rising part and through hole of the seal member included in the seal unit according to the second embodiment can be formed by burring, for example. Generally, stress occurring in a workpiece in the burring can be made smaller than that in deep drawing. Therefore, in the seal unit according to the second embodiment, the rising part and the through hole can be formed by burring even at a place having a thickness of 0.3 mm or less. That is, the second embodiment can also provide the seal unit in which the terminal-connecting part having a small thickness can include the terminal structure capable of exhibiting high sealing performance.

When the seal unit is included in the battery, the inclination angle of the taper part of the seal member, the inclination angle of the diameter-reduction part of the terminal, and the thickness of the gasket can be measured by the following procedures, for example. First, a resin is injected into the battery, and the resin is cured. By cutting through the battery having the cured inner part, the cross-sectional surface of the battery can be obtained while the positions of the seal member, the gasket, the terminal, and the restraining member are held.

The inclination angle can be confirmed from cross-sectional surfaces obtained by cutting through the battery in an x direction, a y direction, and a direction of 45 degrees on the basis of the axial direction of the terminal, for example. When the taper part arrives at the tip of the rising part, regarding the inclination angle of the taper part of the seal member, the inclination angle in the tip of the rising part is measured as the inclination angle of the taper part. On the other hand, when the taper part does not arrive at the tip of the rising part, the inclination angle of a portion of the taper part close to the tip of the rising part is measured as the inclination angle of the taper part. When the taper part arrives at the tip of the rising part, regarding the inclination angle of the diameter-reduction part of the terminal, the inclination angle of the portion of the diameter-reduction part sandwiching a part of the gasket together with the tip of the rising part is measured as the inclination angle of the diameter-reduction part. On the other hand, when the taper part does not arrive at the tip of the rising part, the inclination angle of the portion of the diameter reduction part sandwiching a part of the gasket together with the portion close to the tip of the taper part of the rising part is measured as the inclination angle of the diameter-reduction part of the terminal.

The thickness of the gasket can be confirmed from the cross-sectional surface obtained by cutting through the battery along the axial direction of the terminal, for example. The thickness of the gasket is measured as a thickness in a direction perpendicular to the surface of the through hole of the seal member with which the gasket is in contact.

When the seal unit is not included in the battery, the seal unit is immersed in a resin, and the resin is cured, followed by cutting through the seal unit. Thereby, the cross-sectional surface of the seal unit can be obtained while the positions of the seal member, the gasket, and the terminal are held.

Next, the seal unit according to the second embodiment will be described in more detail.

A seal member can further include a liquid inlet for injecting an electrolytic solution, for example, a nonaqueous electrolyte, and a safety valve capable of releasing the internal pressure of the battery even if the internal pressure of the battery is increased to a specified value or more, or the like.

A gasket can also include a flange part for fixing the gasket to the seal member, for example.

A main part of a terminal includes a first end part and a second end part. The first end part may be a flange part for fixing the terminal to the gasket, for example.

The seal unit according to the second embodiment can further include a lead. The lead can face the second surface of the seal member.

For example, in the seal unit according to the second embodiment, the seal member may include two rising parts. In this case, the seal unit can include two terminals and two leads.

In the seal unit according to the second embodiment, the form of connection between the terminal and the lead is not particularly limited.

For example, a through hole is further formed in the lead, and the main part of the terminal is fitted into the through hole, to allow connection between the terminal and the lead.

Alternatively, a recessed part or a through hole is further formed in a terminal, and a projection part is further provided on the surface of the lead facing the second surface of the seal member. The projection part of the lead is fitted into the recessed part or through hole of the terminal. This also allows connection between the terminal and the lead. The recessed part can be provided on the second end part of the main part of the terminal, for example. The through hole can pass through the main part of the terminal from the first end part to second end part of the main part of the terminal, for example.

The terminal and the lead may be fixed by caulking, or laser-welded.

A restraining member may be a restraining ring wound around the outer perimeter of the rising part of the seal member, for example. Alternatively, the lead may serve as the restraining member. For example, the lead can further include a portion surrounding the rising part of the seal member, for example, a projection.

The seal unit according to the second embodiment can further include an insulating member in order to achieve electrical insulation between the seal member and each of the terminal, the lead, and the restraining member.

As materials for the gasket, the restraining member, lead, and the insulating member capable of being used in the seal unit according to the second embodiment, the materials exemplified in the first embodiment can be used, for example. As materials for the terminal capable of being used in the seal unit according to the second embodiment, the materials for the external terminal exemplified in the first embodiment can be used, for example.

The seal member can be formed from a metal, an alloy, a resin or a laminate of a resin layer and a metal layer and/or an alloy layer, for example. The seal member is preferably made of the same material as that of a container member combined with the seal member to constitute a battery. The seal member is preferably made of a material having corrosion resistance.

Examples of the metal and alloy which can form the seal member include aluminum, an aluminum alloy, or stainless steel. As the aluminum alloy, an alloy containing an element such as magnesium, zinc, or silicon is preferable. If a transition metal such as iron, copper, nickel, or chromium is contained in the alloy, the content thereof is preferably set to 1% by mass or less.

Examples of the resin which can form the seal member include super engineering plastics such as a PPS resin and a PEEK resin.

As the resin layer included in the laminate, a resin layer made of a thermoplastic resin such as polypropylene (PP) or polyethylene (PE) can be used.

Next, an example of the seal unit according to the second embodiment will be described in detail with reference to the drawings.

First, a seal unit as a first example according to the second embodiment will be described with reference to FIGS. 13 to 18.

Figure 13:
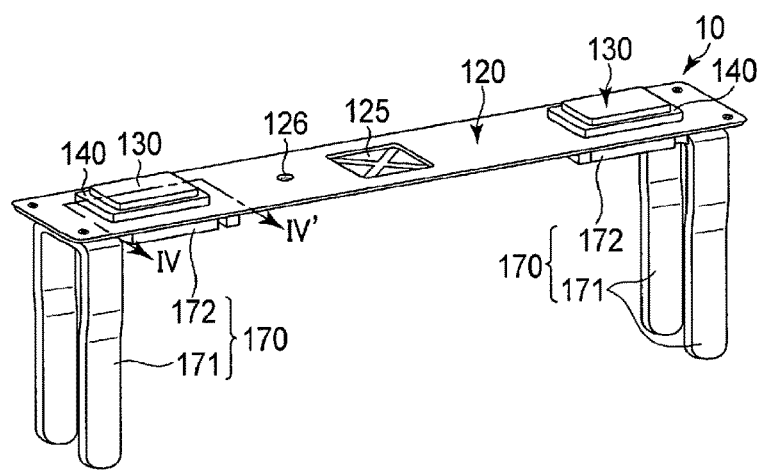
FIG. 13 is a schematic perspective view of a seal unit as a first example according to a second embodiment.
Figure 15:
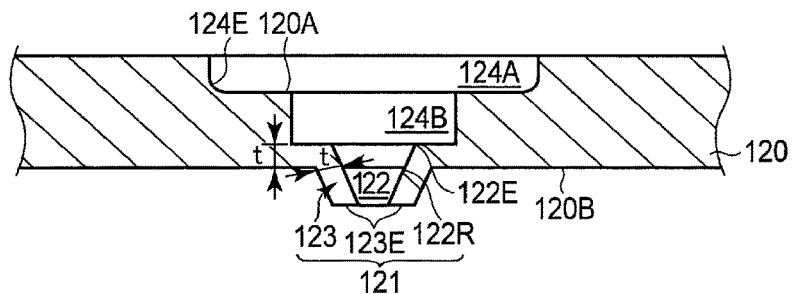
FIG. 15 is a schematic sectional view taken along line III-III' of the seal member shown in FIG. 14.
Figure 16:
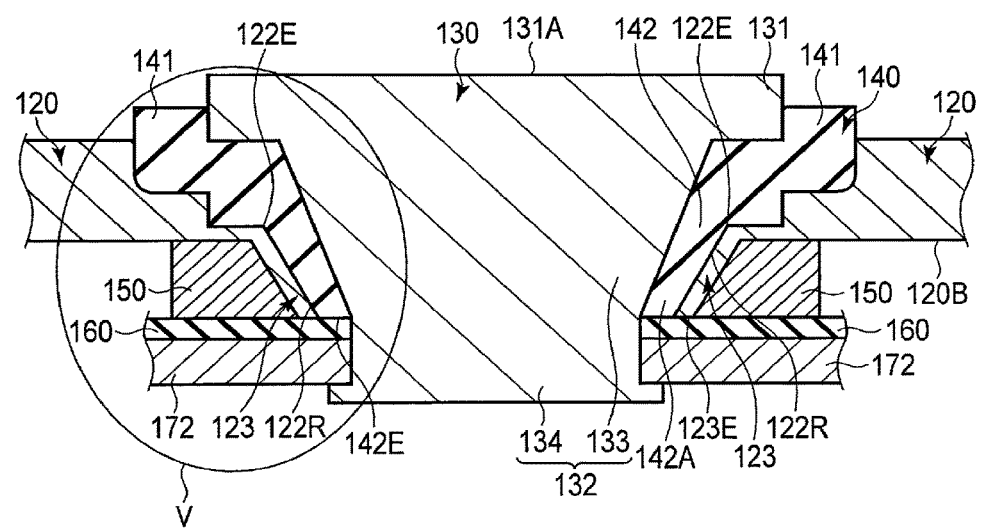
FIG. 16 is a schematic sectional view taken along line IV-IV' of the seal unit shown in FIG. 13.
Figure 18:
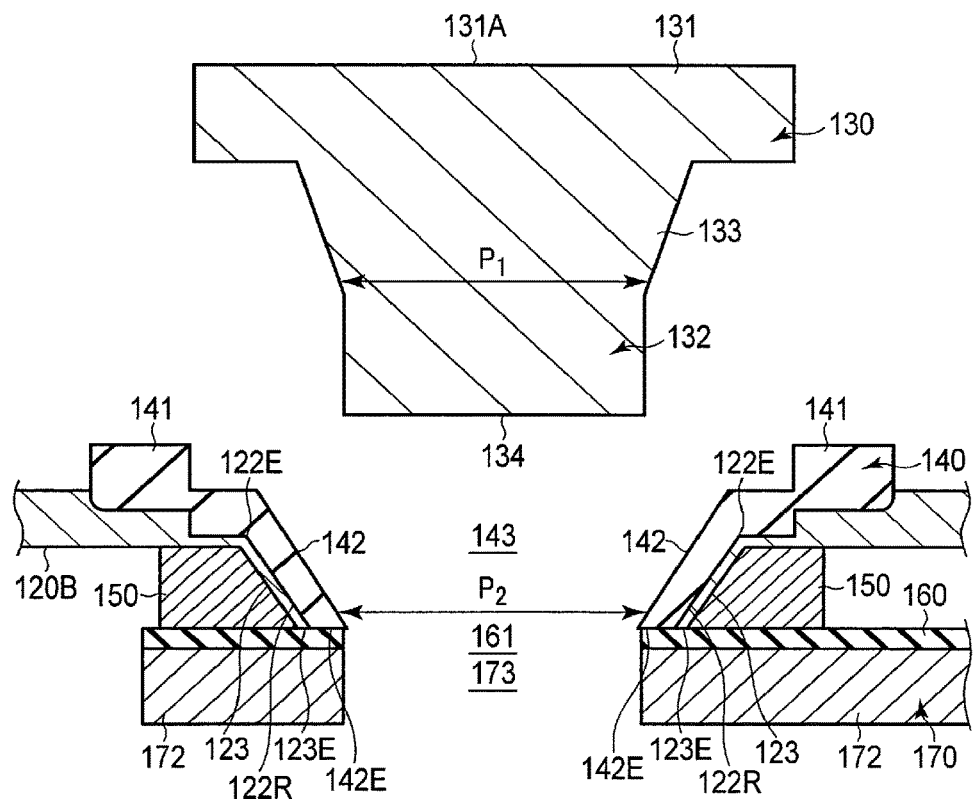
FIG. 18 is a schematic sectional view showing a state before a terminal is incorporated in an example of a production process of the seal unit as the first example.

FIG. 13 is a schematic perspective view of a seal unit as a first example according to a second embodiment. FIG. 14 is a schematic exploded perspective view of the seal unit of FIG. 13. FIG. 15 is a schematic sectional view taken along line of the seal member shown in FIG. 14. FIG. 16 is a schematic sectional view taken along line IV-IV' of the seal unit shown in FIG. 13. FIG. 17 is an enlarged sectional view of a portion V of FIG. 16. FIG. 18 is a schematic sectional view showing a state before a terminal is incorporated in an example of a production process of the seal unit as the first example.

A seal unit 10 as the first example shown in FIGS. 13 to 18 includes a seal member 120 shown in FIGS. 13 to 18, two terminals 130 shown in FIGS. 13, 14, and 16 to 18, two gaskets 140 shown in FIGS. 13, 14 and 16 to 18, two restraining members 150 shown in FIGS. 14 and 16 to 18, two insulating members 160 shown in FIGS. 14 and 16 to 18, and two leads 170 shown in FIGS. 13, 14, and 16 to 18.

As shown in FIG. 14, the seal member 120 is a plate-like member. The seal member 120 includes a first surface 120A and a second surface 120B as a back surface of the first surface 120A, as shown in FIG. 15. The seal unit 10 as the first example corresponds to the container body 31 in the battery 100 described with reference to FIGS. 1 to 4.

The seal member 120 includes a recessed part 124A and recessed part 124B located on the side of the first surface 120A, as shown in FIG. 3. The recessed part 124B is further set back far from a part of the bottom part of the recessed part 124A. An edge part 124E of the recessed part 124A is rounded.

The recessed part 124B shown in FIG. 15 corresponds to a terminal-connecting part 121 shown in FIG. 14. The terminal-connecting part 121 has a thickness t of 0.3 mm or less.

The terminal connecting part 121 includes a rising part 123 including a tip 123E projected from the second surface 120B of the seal member 2, as shown in FIG. 15. The seal member 120 further has a through hole 122 passing through the seal member 120 from the first surface 120A to the tip 123E of the rising part 123 in a direction intersecting the first surface 120A.

The through hole 122 includes a taper part 122R having a diameter that reduces with increasing proximity to the tip 123E of the rising part 123. The rising part 123 including a portion including the taper part 122R has a substantially constant thickness t, as shown in FIG. 15.

The seal member 120 further includes a safety valve 125 shown in FIGS. 13 and 14 and a liquid inlet 126 shown in FIGS. 13 and 14.

The gasket 140 includes a flange part 141 and an shaft 142 extending downward from the flange part 141, as shown in FIGS. 14 and 16 to 18. The gasket 140 further has a through hole 143 passing through the shaft 142 in a direction in which the shaft 142 extends. The through hole 143 has a diameter that reduces with increased distance from the flange part 141, as shown in FIGS. 16 to 18.

As shown in FIGS. 16 to 18, the flange part 141 of the gasket 140 is mounted on the bottom parts of the recessed parts 124A and 124B of the seal member 120. The shaft 142 of the gasket 140 is inserted into the through hole 122 passing through the seal member 120. Therefore, a part 142A of the shaft 142 of the gasket 140 is located in the through hole 122 of the seal member. As shown in FIG. 18, the taper surface of the taper part 122R of the through hole 122 of the seal member 120 is reflected on a part of the inner periphery of the through hole 143 of the shaft 142 of the gasket 140. The taper part 122B of the through hole 122 of the seal member 120 corresponds to the diameter reduction part 39 of the rising part 37 in the battery 100 described with reference to FIGS. 1 to 4.

The lead 170 includes two electrode-connecting parts 171 and a terminal-connecting part 172 connecting the electrode connecting parts, as shown in FIG. 14. The electrode connecting part 171 has a belt-like plane shape. The terminal connecting part 172 is a plate-like member having a strip plane shape, and has a through hole 173.

As shown in FIGS. 16 to 18, the terminal-connecting part 172 of the lead 170 is disposed to face the second surface 120B of the seal member 120. The tip 123E of the rising part 123 of the seal member 120 and a tip 142E of the shaft 142 of the gasket 140 are disposed to be opposed to the terminal-connecting part 172 of the lead 170. Furthermore, as shown in FIGS. 16 to 18, an insulating member 160 is provided between the tip 123E of the rising part 123 and the terminal-connecting part 172 of the lead 170 and between the tip 142E of the shaft 142 of the gasket 140 and the terminal connecting part 172 of the lead 170. The insulating member 160 is a strip member having a through hole 161, as shown in FIG. 14. As shown in FIG. 18, the insulating member 160 is disposed so that one edge part of the through hole 161 is in contact with the tip 142E of the shaft 142 of the gasket 140, and the other edge part of the through hole 161 is in contact with the edge part of the through hole 173 of the terminal-connecting part 172 of the lead 170.

As shown in FIGS. 14, 16, and 18, a terminal 130 includes a flange part 131 and a main part 132. The flange part 131 includes a main surface 131A. The main part 132 extends from the flange part 131 as a first end part in a direction perpendicular to the main surface 131A of the flange part 131, i.e., in an axial direction X. The main part 132 includes a diameter-reduction part 133 including a taper surface having a diameter that reduces with increasing distance from the flange part 131. As shown in FIGS. 16 and 17, the flange part 131 of the terminal 130 is mounted on the flange part 141 of the gasket 140. The terminal 130 corresponds to the positive electrode terminal 5 in the battery 100 described with reference to FIGS. 1 to 4. The main part 132 of the terminal 130 corresponds to the terminal shaft 52 of the positive electrode terminal 5 in the battery 100 described with reference to FIGS. 1 to 4.

The main part 132 of the terminal 130 is disposed to pass through the through hole 143 of the gasket 140, the through hole 161 of the insulating member 160, and the through hole 173 of the lead 170 in order, as shown in FIGS. 14 and 18. Herein, a part of the diameter-reduction part 133 of the terminal 130 is in contact with the inner periphery of the through hole 143 of the gasket 140.

As shown in FIGS. 16 and 17, a tip 134 of the main part 132 of the terminal 130 passing through the through hole 173 of the lead 170 is fixed to the terminal-connecting part 172 of the lead 170 by caulking, to form a caulked part 134 as a second end part of the main part 132.

By the above constitution, as shown in FIGS. 16 and 17, the part 142A of the shaft 142 of the gasket 140 is sandwiched between the taper part 122R of the seal member 120 and the diameter-reduction part 133 of the terminal 130. Since the second end part 134 of the terminal 130 passes through the through hole 173 passing through the terminal-connecting part 172 facing the second surface 120B of the seal member 120, the second end part 134 of the terminal 130 is projected from the second surface 120B of the seal member 120.

The restraining ring 150 included in the seal unit 10 as the first example is put around the outer perimeter of the rising part 123 of the seal member 120. Thereby, as shown in FIG. 16, the restraining ring 150 is disposed so that the part 142A of the shaft 142 of the gasket 140 and the taper part 122R of the seal member 120 are located between the restraining ring 150 and the diameter reduction part 133 of the terminal 130.

Now, as described above, the main part 132 of the terminal 130 includes the diameter-reduction part 133 having a taper surface. As shown in FIG. 17, the taper surface of the diameter-reduction part 133 is inclined by an inclination angle $\theta_1$ with respect to the axial direction X the main part 132 of the terminal 130. As described above, the seal member 120 also includes the taper part 122R having a taper surface. As shown in FIG. 17, the taper surface of the taper part 122R of the seal member 120 is inclined by an inclination angle $\theta_2$ with respect to the axial direction X of the main part 132 of the terminal 130. Herein, the inclination angle $\theta_2$ of the taper part 1228 of the seal member 120 is larger than the inclination angle $\theta_1$ of the diameter-reduction part 133 of the terminal 3. That is, the taper of the taper part 122R is lower than the taper of the diameter-reduction part 133.

The shaft 142 of the gasket 140 sandwiched between the diameter reduction part 133 of the terminal 130 and the taper part 122R of the seal member 120 which have taper surfaces having different angles of inclination described above includes a portion 142A subjected to pressure from the diameter-reduction part 133 of the terminal 130 and the taper part 122R of the seal member 120, as described later with reference to FIG. 18.

As described above, the shaft 142 of the gasket 140 is inserted into the through hole 122 of the seal member 120, as shown in FIG. 18. Since the through hole 122 includes the taper part 122R described above, the inner periphery of the through hole 143 of the shaft 142 of the gasket 140 inserted into the through hole 122 includes a taper surface on which the taper of the taper part 122R of the through hole 122 is reflected.

As described above, the diameter-reduction part 133 of the terminal 130 is inserted into the through hole 143 of the gasket 140 so that a part of the diameter-reduction part 133 is in contact with the inner periphery of the through hole 143 of the gasket 140. Therefore, the terminal 130 is designed so that the outer diameter of at least a part of the diameter-reduction part 133 of the main part 132 is equal to or more than the inner diameter of at least a part of the through hole 143 of the gasket 140. Since the inclination angle $\theta_2$ of the taper part 122R of the seal member 120 is reflected on the inclination angle of the inner periphery of the through hole 143 of the gasket 140 before the main part 132 of the terminal 130 is inserted, the inclination angle of the inner periphery of the through hole 143 of the gasket 140 is gentler than the inclination angle $\theta_1$ of the diameter-reduction part 133 of the terminal 130. Therefore, as shown in FIG. 18, the shaft 142 of the gasket 140 includes a portion in which an inner diameter $P_2$ of the through hole 143 is smaller than an outer diameter $P_1$ of at least a part of the diameter-reduction part 133 of the terminal 130 before the main part 132 of the terminal 130 is inserted.

When the main part 132 of the terminal 130 is inserted into the through hole 143 of the gasket 140 described above, a portion of the shaft 142 of the gasket 140 in which the inner diameter of the through hole 143 of the gasket 140 is smaller than the outer diameter of the diameter-reduction part 133 of the terminal 130 is subjected to pressure from the diameter-reduction part 133 of the terminal 130. Simultaneously, the portion of the shaft 142 of the gasket 140 is subjected to pressure also from the taper part 122R of the seal member 120.

The portion subjected to pressure from the diameter-reduction part 133 of the terminal 130 in the shaft 142 of the gasket 140 is subjected to a restraining force from the restraining ring 150 as a counteraction of pressure from the diameter-reduction part 133 via the taper part 122R of the seal member 120.

Therefore, the seal unit 10 as the first example shown in FIGS. 13 to 17 can achieve high tightness of contact between the diameter-reduction part 133 of the terminal 130 and the shaft 142 of the gasket 140, and of contact between the taper part 122R of the seal member 120 and the shaft 142 of the gasket 140, and eventually can achieve high sealing performance.

In the seal unit 10 as the first example, as shown in FIG. 17, the shaft 142 of the gasket 140 includes a first portion 142$_1$ having a maximum thickness $T_1$, and a second portion 142$_2$ having a minimum thickness $T_2$, in a portion in which the shaft 142 of the gasket 140 is sandwiched between the taper part 122R of the seal member 120 and the diameter reduction part 133 of the terminal 130. As shown in FIG. 17, the first portion 142$_1$ corresponds to a root portion located on the side of the flange part 141 of the shaft 142 of the gasket 140. The second portion 142$_2$ corresponds to the end part of the shaft 142 close to the tip 123E of the rising part 123. That is, the first portion 142$_1$ is disposed closer to an edge part 122E of the through hole (although not shown in FIG. 17, reference mark 22 is attached in FIG. 14) of the terminal connecting part 121 than the second portion 142$_2$. In other words, the second portion 142$_2$ is disposed closer to the tip 123E of the rising part 123 of the seal member 120 than the first portion 142$_1$. The second portion 142$_2$ having a thickness smaller than that of the first portion 142$_1$ means that the second portion 142$_2$ is compressed by pressure from the taper part 122R of the seal member 120 and the diameter-reduction part 133 of the terminal 130.

Hereinabove, one terminal 130 of which the schematic sectional view is shown in FIG. 16 has been described. The other terminal 130 included in the seal unit 10 as the first example shown in FIGS. 13 to 17 also has the same structure and arrangement as those of the terminal 130 described above. Therefore, the seal unit 10 as the first example shown in FIGS. 13 to 17 can achieve high sealing performance in the two terminals 130.

The seal unit 10 as the first example shown in FIGS. 13 to 17 can be used as a seal member for a nonaqueous electrolyte battery, for example. Since the seal unit 10 as the first example can exhibit high sealing performance, the seal unit 10 can prevent the leakage of a nonaqueous electrolyte and the infiltration of moisture, or the like, if the seal unit 10 is included in the nonaqueous electrolyte battery. Particularly, for example, when the seal unit 10 as the first example is used as the seal member of the nonaqueous electrolyte battery in a state where the second surface 120B of the seal member 120 faces the inner side of the battery, the seal member 120 can minimize the leakage course of a nonaqueous electrolyte and the infiltration course of moisture because the through hole 122 has the minimum diameter at the position of the tip 123E of the rising part 123 of the seal unit 120. As a result, the seal unit 10 as the first example can achieve a nonaqueous electrolyte battery which can prevent problems such as deterioration in battery performance, for example.

Furthermore, in the seal unit 10 as the first example shown in FIGS. 13 to 17, as shown in FIGS. 16 and 17, the tip 123E of the rising part 123 is projected from the second surface 120B of the seal member 120. When the seal unit 10 is used in a state where the second surface 120B of the seal member 120 faces the inner side of the battery, the rising part 123 of the terminal connecting part 121 of the seal member 120 may be deformed so that the terminal 130 surrounded by the rising part 123 is tightened in the case where the internal pressure of the battery is increased. That is, the battery including the seal unit 10 as the first example can maintain high sealing performance even if the internal pressure of the battery is increased.

The seal unit 10 as the first example easily controls a distance between the terminal 130 and the seal member 120, i.e., a space into which the gasket 140 is inserted.

Next, a seal unit as a second example according to the second embodiment will be described with reference to FIGS. 19 to 21.

Figure 19:
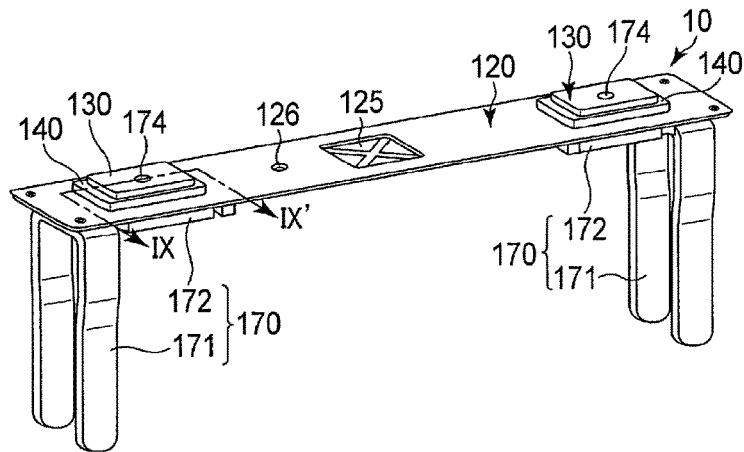
FIG. 19 is a schematic perspective view of a seal unit as a second example according to the second embodiment.

FIG. 19 is a schematic perspective view of a seal unit as a second example according to the second embodiment. FIG. 20 is a schematic exploded perspective view of the seal unit shown in FIG. 19. FIG. 21 is a schematic sectional view taken along line IX-IX' of the seal unit shown in FIG. 19.

A seal unit 10 shown in FIGS. 19 to 21 includes a seal member 120 shown in FIGS. 19 to 21, two terminals 130 shown in FIGS. 19 to 21, two gaskets 140 shown in FIGS. 19 to 21, two insulating members 160 shown in FIGS. 20 and 21, and two leads 170 shown in FIGS. 19 to 21.

The seal member 120 and the gasket 140 have the same structures as those of the seal unit 10 as the first example described with reference to FIGS. 13 to 18. Therefore, herein, the descriptions thereof are omitted.

The lead 170 includes two electrode connecting parts 171 and a terminal-connecting part 172, as shown in FIG. 20. The electrode-connecting part 171 has a belt-like plane shape. As shown in FIG. 20, the terminal connecting part 172 is a plate-like member having a strip plane shape, and has the main surface on which a rod-like connecting projection 174 is provided. The terminal-connecting part 172 includes the main surface on which a restraining projection 175 is further provided. The restraining projection 175 has a ring-like plane shape. The ring centers on the connecting projection 174.

As shown in FIGS. 20 and 21, as with the seal unit 10 as the first example, also in the seal unit 10 as the second example, a flange part 141 of the gasket 140 is mounted on the bottom parts of recessed parts 124A and 124B of a terminal connecting part 121 of a seal member 12. As shown in FIG. 21, an shaft 142 of the gasket 140 is inserted into a through hole 122 of the seal member 120. Therefore, as shown in FIG. 21, the taper surface of a taper part 122R of the seal member 120 is reflected on the inner periphery of a through hole 143 of the shaft 142 of the gasket 140.

Herein, as shown in FIG. 21, a tip 123E of a rising part 123 of the seal member 120 and a tip 142E of the shaft 142 of the gasket 140 are disposed to be opposed to the lead 170 with an insulating ring 160 sandwiched therebetween. As shown in FIG. 21, the rising part 123 of the seal member 120 is opposed to the restraining projection 175 of the lead 170 with the insulating ring 160 sandwiched therebetween. As shown in FIG. 21, when the insulating ring 160 is sandwiched between the rising part 123 of the seal member 120 and the restraining projection 175 of the lead 170, a portion in contact with the taper part 122R of the seal member 120 is deformed in a reflection of the surface shape of the taper part 122B. On the other hand, a portion in contact with the restraining projection 175 of the lead 170 is deformed in a reflection of the surface shape of the restraining projection 175.

The terminal 130 shown in FIGS. 19 to 21 is different from the terminal 130 shown in FIGS. 13, 14, and 16 to 18 in that the terminal 130 has a through hole 135 starting from a main surface 131A of a flange part 131 and arriving at a tip 132A of a main part 132. The terminal 130 corresponds to the positive electrode terminal 9 of the battery 100' described with reference to FIGS. 6 to 8. The main part 132 of the terminal 130 corresponds to the terminal shaft 92 of the positive electrode terminal 9 in the battery 100' described with reference to FIGS. 6 to 8.

As shown in FIGS. 20 and 21, the flange part 131 of the terminal 130 is mounted on the flange part 141 of the gasket 140. As shown in FIG. 21, the main part 132 of the terminal 130 passes through the through hole 143 of the gasket 140, and the tip 132A is in contact with the terminal connecting part 172 of the lead 170. Furthermore, the connecting projection 174 of the lead 170 is fitted into the through hole 135 of the terminal 130. The end part of the connecting projection 174 of the lead 170 is welded to the main surface 131A of the flange part 131 of the terminal 130.

By the above constitution, as shown in FIG. 21, a part of a diameter-reduction part 133 of the terminal 130 is surrounded by the shaft 142 of the gasket 140, and the outside of the shaft 142 is further surrounded by the rising part 123 of the seal member 120.

As shown in FIG. 21, the rising part 123 surrounding the diameter-reduction part 133 of the terminal 130 and the shaft 142 of the gasket 140 is further restrained by the restraining projection 175 provided on the lead 170. That is, in the seal unit 10 as the second example, the lead 170 can exhibit the same restraining function as that of the restraining ring 150 included in the seal unit 10 as the first example.

Now, as described above, the main part 132 of the terminal 130 includes the diameter-reduction part 133 having a taper surface. As shown in FIG. 21, the taper surface is inclined by an inclination angle $\theta_1$ with respect to the axial direction X of the main part 132 of the terminal 130. As described above, the seal member 120 also includes the taper part 122R having a taper surface. As shown in FIG. 21, the taper surface is inclined by an inclination angle $\theta_2$ with respect to the axial direction X the main part 132 of the terminal 130. Herein, the inclination angle $\theta_2$ of the taper part 122B of the seal member 120 is larger than the inclination angle $\theta_1$ of the diameter-reduction part 133 of the terminal 130. That is, the taper of the taper part 122R of the seal member 120 is gentler than the taper of the diameter-reduction part 133 of the terminal 130.

The shaft 142 of the gasket 140 sandwiched between the diameter-reduction part 133 of the terminal 130 and the taper part 122R of the seal member which have taper surfaces having different angles of inclination described above includes a portion 142A subjected to pressure from the diameter reduction part 133 of the terminal 130 and the taper part 122R of the seal member 120 for the same reason as that described for the seal unit 10 as the first example. The shaft 142 of the gasket 140 in the seal unit 10 as the second example is subjected to a restraining force from the restraining projection 175 as a counteraction of pressure from the diameter-reduction part 133 of the terminal 130 via the taper part 122R of the seal member 120, as with the shaft 142 of the gasket 140 in the seal unit 10 as the first example. Therefore, the seal unit 10 as the second example can achieve high sealing performance for the same reason as that of the seal unit 10 as the first example.

Furthermore, in the seal unit 10 as the second example shown in FIGS. 19 to 21, as shown in FIG. 21, the tip 123E of the rising part 123 is projected from the second surface 120B of the seal member 120. When the seal unit 10 is used in a state where the second surface 120B of the seal member 120 faces the inner side of the battery, the rising part 123 of the terminal-connecting part 121 of the seal member 120 may be deformed so that the terminal 130 surrounded by the rising part 123 is tightened in the case where the internal pressure of the battery is increased. That is, the battery including the seal unit 10 as the second example can maintain high sealing performance even if the internal pressure of the battery is increased.

Hereinabove, one terminal 130 has been described above. The other terminal 130 included in the seal unit 10 as the second example shown in FIGS. 19 to 21 also has the same structure and arrangement as those of the terminal 130 described above. Therefore, the seal unit 10 as the second example shown in FIGS. 19 to 21 can achieve high sealing performance in the two terminals 130.

The seal unit 10 as the second example easily controls a distance between the terminal 130 and the seal member 120, i.e., a space into which the gasket 140 is inserted.

The seal unit 10 described above allows various changes to be made.

For example, the gasket 140 of the seal unit 10 as the first example or the second example can also be changed to a gasket 4 including a recessed part 41B as shown in FIG. 10. In this case, the terminal 130 can also be changed to an external terminal 5 including a flange part 51 including a projection 51D as shown in FIG. 10. The use of the gasket 4 and the external terminal 5 can achieve more excellent sealing performance for the reason described above.

Alternatively, the terminal 130 of the seal unit 10 as the first example or the second example can also be changed to an external terminal 5 including a diameter-reduction part 53 including a step part 53B as shown in FIGS. 11 and 12. The use of the external terminal 5 can achieve more excellent sealing performance for the reason described above.

Next, a production process of a seal member as an example which can be included in the seal unit according to the second embodiment will be described.

FIG. 22 shows an example of a production process of a terminal-connecting part of the seal member which can be included in the seal unit according to the second embodiment. A seal member 120 which can be produced by the production process described with reference to FIG. 22 is a seal member including formed from a metal, an alloy, a laminate of a resin layer and a metal layer and/or an alloy layer, for example.

First, as shown in FIG. 22A, a plate 120 as a material for the seal member is provided. The plate 120 includes a first surface 120A and a second surface 120B. The distance between the first surface 120A and the second surface 120B is the thickness of the plate 120.

Next, as shown in FIG. 22B, a gauging hole 124C is opened in the plate 120 so as to pass through the plate 120 from the first surface 120A to the second surface 120B.

Next, as shown in FIG. 22C, the first surface 120A of the plate 120 is pressed, to form a recessed part 124A having a bottom area smaller than the area of the first surface 120A of the plate 120. A peripheral part 120S of the bottom part of the recessed part 124A includes a curved surface, as shown in FIG. 22C. According to this process, the first surface 120A of the plate 120 includes the bottom part of the recessed part 124A. As shown in FIG. 22C, according to the process, the plate 120 expands toward the axis of the gauging hole 124C and expands toward the outside from an edge part 120E, so as to correspond to the volume of the recessed part 124A.

Next, as shown in FIG. 22D, the first surface 120A of the plate 120 is pressed, to form a recessed part 124B having a bottom area smaller than that of the recessed part 124A on the bottom part of the recessed part 124A. According to the process, the first surface 120A of the plate 120 includes the bottom part of the recessed part 124B. As shown in FIG. 22D, according to the process, the plate 120 expands toward the axis of the gauging hole 124C and expands toward the outside from the edge part 120E, so as to correspond to the volume of the recessed part 124B. In the example shown in FIG. 22, according to the process of FIG. 22D, the gauging hole 124C becomes blocked. A distance t between the bottom part of the recessed part 124B of the plate material 120 and the second surface 120B is 0.3 mm or less.

Next, as shown in FIG. 22E, a through hole 122 is provided, which passes through the plate 120 so as to arrive at the second surface 120B from the bottom part of the recessed part 124B of the plate 120, i.e., a part of the first surface 120A of the plate 120. Simultaneously, a rising part 123 is provided so as to extend downward from an edge part 122E of the through hole 122. The rising part 123 includes a tip 123E projected from the second surface 120B of the plate 120. The through hole 122 passes through the plate 120 from the first surface 120A of the plate 120 to the tip of the rising part 123. The through hole 122 includes a taper part 122R having a diameter that reduces with increasing proximity to the tip 123E of the rising part 123. The through hole 122 and the rising part 123 can be formed by burring, for example.

Finally, as shown in FIG. 22F, the outer shape of an edge part 12E of the plate 120 expanded by a press is adjusted by cutting. Thereby, the seal member 120 as an example which can be included in the seal unit according to the second embodiment can be obtained.

In the production process as an example shown in FIG. 22, as described above, in the process shown in FIG. 22C, the recessed part 124A including the peripheral part 120R having a curved surface is provided. As described with reference to FIGS. 22C and 22D, the recessed parts 124A and 124B which constitute two steps are formed. These artifices can form a thin terminal-connecting part 121 having a thickness of, specifically, 0.3 mm or less as shown in FIG. 22F while preventing the crack and crinkle of the seal member 120.

When the seal member is made of a resin, the seal member as an example which can be included in the seal unit according to the second embodiment can be obtained by injection molding or the like using a target mold.

According to a second embodiment, a seal unit is provided. In the seal unit, at least a part of the gasket is sandwiched between the taper part of the seal member and the diameter-reduction part of the terminal. The inclination angle of the taper part is larger than the inclination angle of the diameter-reduction part. Because of this, the seal unit according to the second embodiment can achieve high tightness of contact between the diameter reduction part of the terminal and the gasket, and of contact between the taper part of the seal member and the gasket, and eventually can exhibit high sealing performance.

Third Embodiment

According to a third embodiment, a battery is provided. The battery includes a container body, an electrode body, and the seal unit according to the second embodiment. The container body has an opening. The electrode body is housed in the container body. The seal unit seals the opening of the container body. The second surface of the seal member included in the seal unit faces the electrode body.

The battery according to the third embodiment may be a primary battery or a secondary battery. Examples of the battery according to the third embodiment include a lithium-ion secondary battery.

The battery according to the third embodiment includes the container body having an opening. The electrode body is housed in the container body.

The electrode body can include a positive electrode and a negative electrode. The positive electrode can include a positive electrode current collector, a positive electrode material layer formed thereon, and a positive electrode current-collecting tab, for example. The negative electrode can include a negative electrode current collector, a negative electrode material layer formed thereon, and a negative electrode current-collecting tab, for example. The positive electrode material layer can contain a positive electrode active material, a conductive agent, and a binder, for example. The negative electrode material layer can contain a negative electrode active material, a conductive agent, and a binder, for example. The positive electrode material layer and the negative electrode material layer may be disposed to be opposed to each other.

The electrode body can further include a separator sandwiched between the positive electrode material layer and negative electrode material layer opposed to each other.

The structure of the electrode body is not particularly limited. For example, the electrode body can have a stack structure. The stack structure has a structure in which a positive electrode and a negative electrode described above are stacked with a separator sandwiched therebetween. Alternatively, the electrode body can have a coiled structure. The coiled structure is a structure in which a laminate obtained by, as described above, stacking a positive electrode and a negative electrode with a separator sandwiched between the positive and negative electrodes is wound in a spiral form.

The battery according to the third embodiment further includes the seal unit according to the second embodiment. The seal unit seals the opening of the container body so that the second surface of the seal member faces the electrode body.

As described above, the seal unit according to the second embodiment can exhibit high sealing performance. Because of this, a nonaqueous electrolyte secondary battery encompassed in the third embodiment can prevent the infiltration of moisture into the battery and the leakage of a nonaqueous electrolyte, for example, and eventually can prevent problems such as deterioration in battery performance, for example.

The terminal of the seal unit according to the second embodiment is electrically connected to the electrode body via the lead, for example. The seal unit according to the second embodiment can include two terminals, for example. One terminal may be connected to the positive electrode of the electrode body, and the other terminal may be connected to the negative electrode of the electrode body.

The sealing of the opening of the container body by the seal unit can be performed by welding the peripheral part of the opening and a portion of the seal member in contact with the peripheral part, for example.

When the battery according to the third embodiment is a nonaqueous electrolyte battery, the battery can further include a nonaqueous electrolyte. In this case, the container body can also further house the nonaqueous electrolyte.

As materials for the positive electrode, the negative electrode, the separator, and the electrolytic solution which can be used in the nonaqueous electrolyte battery as an example of the battery according to the third embodiment, the materials therefor described in the first embodiment can be used, for example.

The container body is preferably made of a material having corrosion resistance. The container body is preferably made of the same material as that of the seal member included in the seal unit according to the second embodiment.

The wall thickness of the container body can be set independently of the thickness of the seal member according to strength required for the battery, for example.

The seal member and the container body can also constitute one container member. That is, the seal member and the container body can also constitute the same container member as that included in the battery according to the first embodiment.

Next, a battery as an example according to the third embodiment will be described in more detail with reference to the drawings.

FIG. 23 is a schematic exploded perspective view of a battery as an example according to a third embodiment.

A battery 1000 shown in FIG. 23 includes a seal unit 10, an electrode body 180, and a container body 190. The seal unit 10 is the seal unit 10 as an example according to the second embodiment described with reference to FIGS. 13 to 18. Therefore, herein, the description of the seal unit 10 is omitted.

The electrode body 180 shown in FIG. 23 includes a positive electrode, a negative electrode, and a separator which are not shown. The positive electrode includes a belt-like positive electrode current collector, a positive electrode material layer formed thereon, and a positive electrode current-collecting tab. The negative electrode includes a belt-like negative electrode current collector, a negative electrode material layer formed thereon, and a negative electrode current-correcting tab.

The electrode body 180 is obtained by laminating a positive electrode, a negative electrode, and a separator so that a positive electrode material layer and a negative electrode material layer are disposed to be opposed to each other with a separator sandwiched therebetween, and coiling the laminate thus obtained. When the laminate is produced, the positions of the positive electrode and the negative electrode are adjusted so that the positive electrode tab and the negative electrode tab extend in opposite directions to each other from the coiled laminate.

The electrode body 180 further includes a sandwiching part 181 sandwiching the positive electrode current-collecting tab extending from the coiled laminate, a sandwiching part 182 sandwiching the negative electrode current-collecting tab extending from the coiled laminate, and an insulating seal 183 covering the coiled laminate excluding the positive electrode tab and the negative electrode tab.

The electrode body 180 is opposed to a second surface 120B of a seal member 120 of the seal unit 10, as shown in FIG. 23.

Although FIG. 23 shows the exploded view, the sandwiching part 181 of the electrode body 180 is laser-welded to electrode connecting parts 171 of one lead 170 of the seal unit 10 in a state where the sandwiching part 181 is sandwiched between the electrode connecting parts 171. Similarly, the sandwiching part 182 of the electrode body 180 is laser-welded to electrode connecting parts 171 of the other lead 170 of the seal unit 10 in a state where the sandwiching part 182 is sandwiched between the electrode connecting parts 171. Thus, the electrode body 180 is electrically connected to terminals 130 of the seal unit 10.

The container body 190 shown in FIG. 23 is a container body having a bottomed square-type shape. The container body 190 has one end part having an opening 191.

The container body 190 houses the electrode body 180 and the two leads 170. Although not shown in the drawings, the container body 190 further houses a nonaqueous electrolyte.

In the container body 190, an insulating member 192 shown in FIG. 23 is disposed between the inner wall of the container body 190, and the lead 170 and sandwiching part 181 of electrode body 180 laser-welded to each other. Thus, electrical insulation between the electrode body 180 and the container body 190 is secured.

Although FIG. 23 shows the exploded view, the peripheral part of the opening 191 of the container body 190 is laser-welded to a portion of the seal member 120 facing the peripheral part. Thus, the opening 191 of the container body 190 is sealed by the seal unit 10.

According to a third embodiment, a battery is provided. The battery includes the seal unit according to the second embodiment. The seal unit seals the opening of the container body. Because of this, the battery according to the third embodiment can achieve excellent sealing performance.

EXAMPLES

The present invention will be described in more detail below with reference to examples, but the present invention is not limited to the examples shown below without deviating from the spirit of the invention.

Example 1

In Example 1, a battery unit 100 was produced, which had the same structure as that of a battery 100 shown in FIGS. 1 to 4 except that an electrode body 1 and a nonaqueous electrolyte were not housed.

A container body 31 and a sealing plate 32 were formed using a 0.1-mm-thick stainless plate.

An aluminum alloy was used as a material for a lead 2, a positive electrode terminal 5, and a negative electrode terminal 5'. A stainless material was used as a material for a restraining ring.

Furthermore, as a material for a gasket 4, a tetrafluoroethylene-perfluoroalkyl vinyl ether copolymer (PFA) was used.

[Test]

(1) He Leak Test

The produced battery unit 100 was subjected to a He leak test in the following procedures.

First, the positive electrode terminal 5 and the negative electrode terminal 5' located on the side of the container body 31 were sealed. Then, He pressurized at a gage pressure of 0.1 MPa was blown from the sides of the positive electrode lead 2 and negative electrode lead for 1 second, and a He leak amount after 30 seconds was detected (vacuum inspecting method).

The battery unit 100 of Example 1 had a He leak amount of $1.0 \times 10^{-11}$ Pa·m³/s.

(2) Confirmation of Inclination Angle

In the battery unit 100 of Example 1, inclination angles $\theta_1$ of a diameter-reduction parts 53 of terminal shafts 52 of the positive electrode terminal 5 and the negative electrode terminal 5', and an inclination angle $\theta_2$ of diameter-reduction parts 39 of rising parts 37 of a container member 3 were measured in the procedures described above.

As a result of the measurement, the inclination angle $\theta_1$ of the terminal shaft 52 of the positive electrode terminal 5 of the battery unit 100 of Example 1 was 5 degrees. The inclination angles $\theta_2$ of the rising parts 37 of the container member 3 of the battery unit 100 of Example 1 were 10 degrees. The inclination angle of the terminal shaft of the negative electrode terminal 5' was the same as the inclination angle $\theta_1$ of the terminal shaft 52 of the positive electrode terminal 5.

(3) Measurement of Thickness of Gasket 4

The thickness of the shaft 42 of the gasket 4 in the battery unit 100 of Example 1 was measured by the method described above. The measurement results showed that a thickness $T_2$ of a second portion $42_2$ shown in FIG. 4 in the shaft 42 of the gasket 4 was smaller than a thickness $T_1$ of a first portion $42_1$.

Example 2

A battery unit 100 was produced in the same manner as in Example 1 except that the inclination angle of a rising part 37 of a container member 3 was increased, and the taper of the diameter-reduction part 39 of the rising part 37 was made gentler.

Comparative Example 1

A battery unit was produced in the same manner as in Example 1 except that a diameter-reduction part was not provided in a rising part 37 of a container member 3, and a diameter-reduction part was not provided in each of a positive electrode terminal 5 and a negative electrode terminal 5'.

Comparative Example 2

A battery unit was produced in the same manner as in Example 1 except that a diameter reduction part was not provided in a rising part 37 of a container member 3.
[Evaluation]
Example 2, Comparative Example 1, and Comparative Example 2 were also subjected to the same test as that of Example 1. The results of the tests are shown together with the results of the test of Example 1 in the following Table 1.

TABLE 1

|  | Comparative Example 1 | Comparative Example 2 | Example 1 | Example 2 |
|---|---|---|---|---|
| Inclination Angle $\theta_1$ of Terminal Shaft 52 of Positive Electrode terminal 5 | 0 degrees | 0 degrees | 5 degrees | 5 degrees |
| Inclination Angle $\theta_2$ of Rising Part 37 of Container Body 3 | 0 degrees | 10 degrees | 10 degrees | 14 degrees |
| He Leak Amount [Pa · m³/s] | $1.0 \times 10^{-8}$ or more | $1.0 \times 10^{-8}$ or more | $1.0 \times 10^{-10}$ or less | $1.0 \times 10^{-10}$ or less |
| Determination | X | X | ○ | ◎ |

The results shown in Table 1 show that the battery units 100 of Examples 1 and 2 exhibited excellent He leak preventing properties while having a terminal-connecting part 34 having a small thickness of 0.3 mm.

Also, the results shown in Table 1 show that the battery unit 100 of Example 2 exhibited more excellent He leak preventing properties than that of the battery unit 100 of Example 1. This is considered to be because the difference between the inclination angle $\theta_1$ of the terminal shaft 52 of the positive electrode terminal 5 and the inclination angle $\theta_2$ of the rising part 37, and the difference between the inclination angle $\theta_1$ of the terminal shaft of the negative electrode terminal 5' and the inclination angle $\theta_2$ of the rising part 37 in Example 2 were larger than those in Example 1, which could achieve higher tightness of contact between the diameter-reduction part 53 of the terminal shaft 52 of the positive electrode terminal 5 and the shaft 42 of the gasket 4, of contact between the diameter-reduction part of the terminal shaft of the negative electrode terminal 5' and the shaft 42 of the gasket 4, and of contact between the diameter-reduction part 39 of the rising part 37 and the shaft 42 of the gasket 4, and eventually could achieve higher sealing performance.

On the other hand, the results shown in Table 1 show that the battery units of Comparative Examples 1 and 2 had poorer He leak preventing properties than those of the battery units of Examples 1 and 2.

In Comparative Example 1, it is considered that a diameter-reduction part was not present in the terminal shaft 52 of the positive electrode terminal 5 and the terminal shaft of the negative electrode terminal 5', and a diameter-reduction part was not present also in the rising part 37, which caused low tightness of contact between each terminal shaft and the gasket 4 and of contact between the rising part 37 and the gasket 4.

In Comparative Example 2, a diameter reduction part was not present in the terminal shaft 52 of the positive electrode terminal 5 and the terminal shaft of the negative electrode terminal 5'. Therefore, it is considered that the battery unit of Comparative Example 2 had low tightness of contact between each terminal shaft and the gasket 4 and of contact between the rising part 37 and the gasket 4. This result shows that the battery unit cannot achieve high sealing performance when a diameter-reduction part is not present also in the terminal shaft 52 of the positive electrode terminal 5 and the terminal shaft of the negative electrode terminal 5' even if the diameter-reduction part is present in the rising part 37.

Example 3

In Example 3, a battery unit 1000 was produced, which had the same structure as that of a battery 1000 shown in FIG. 23 except that an electrode body 180 and a nonaqueous electrolyte were not housed.

A container body 190 was formed using a 0.5-mm-thick aluminum plate. Regarding a seal member 120, a 0.3-mm-thick terminal-connecting part 121 was formed by the same method as that described with reference to FIG. 22 using a 1.1-mm-thick aluminum plate.

An aluminum alloy was used as a material for a terminal 130 and a lead 170. A stainless steel material was used as a material for a restraining ring 150.

Furthermore, as a material for a gasket 140, a tetrafluoroethylene-perfluoroalkyl vinyl ether copolymer (PFA) was used.

[Test]
(1) He Leak Test
The produced battery unit 1000 was subjected to a He leak test in the following procedures.

First, the terminal 130 located on the side of a seal unit 10 was sealed. Then, He pressurized at a gauge pressure of 0.1 MPa was blown from the side of the lead 7 for 1 second, and a He leak amount after 30 seconds was detected (vacuum inspecting method).

The battery unit 1000 of Example 3 had a He leak amount of $1.0 \times 10^{-11}$ Pa·m³/s or less.

(2) Confirmation of Inclination Angle
In the battery unit 1000 of Example 3, an inclination angle $\theta_1$ of a diameter-reduction part 133 of the terminal 130 and an inclination angle $\theta_2$ of a taper part 122R of the seal member 120 were measured using the procedures described above.

As a result of the measurement, the inclination angles $\theta_1$ of the diameter-reduction parts 133 of the two terminals 130 of the battery unit 1000 of Example 3 were the same, and 5 degrees. The inclination angles $\theta_2$ of the two taper parts 122S of the seal member 120 of the battery unit 1000 of Example 3 were the same, and 14 degrees.

(3) Measurement of Thickness of Gasket 140
The thickness of the shaft 142 of the gasket 140 in the battery unit 1000 of Example 3 was measured by the method described above. The measurement results showed that, in the shaft 142 of the gasket 140, a thickness $T_2$ of a second portion $142_2$ shown in FIG. 17 is smaller than a thickness $T_1$ of a first portion $142_1$.

Example 4

A battery unit 1000 was produced in the same manner as in Example 3 except that the inclination angle of a taper part 122R of a seal member 120 was increased, and the taper of a taper part 122R was made gentler to 20 degrees.

Comparative Example 3

A battery unit was produced in the same manner as in Example 3 except that a taper part was not provided on a seal member 120.

[Evaluation]

Example 4 and Comparative Example 3 were also subjected to the same test as that of Example 3. The results of the tests are shown together with the results of the test of Example 3 in the following Table 2.

TABLE 2

|  | Comparative Example 3 | Example 3 | Example 4 |
|---|---|---|---|
| He leak amount [Pa · m³/s] | $1.0 \times 10^{-8}$ or more | $1.0 \times 10^{-10}$ or less | $1.0 \times 10^{-11}$ or less |
| Determination | X | ◯ | ◉ |

The results of Table 2 show that the battery units 1000 using the seals units 10 of Example 3 and Example 4 could achieve more excellent sealing performance than that of the battery unit using the seal unit of Comparative Example 3.

Example 5

A battery unit 100 was produced in the same manner as in Example 1 except that a gasket 4 including a recessed part 41B as shown in FIG. 10 was used; a positive electrode terminal 5 including a flange part 51 including a projection 51D as shown in FIG. 10 was used; and a negative electrode terminal 5' which was similar to the positive electrode terminal 5 was used.

The projection 51D had a height of 0.5 mm from a mounting surface 51C of the flange part 51 of the positive electrode terminal 5. The recessed part 41B of the gasket 4 had a depth of 0.1 mm.

Example 6

A battery unit 100 was produced in the same manner as in Example 1 except that an external terminal 5 including a diameter reduction part 53 including a step part 53B as shown in FIGS. 11 and 12 was used, and a negative electrode terminal 5' which was similar to a positive electrode terminal 5 was used.

In an axial direction X in a portion surrounded by a diameter-reduction part 39 of a rising part 37 in a terminal shaft 52 of the positive electrode terminal 5, the ratio of the length of the diameter-reduction part 53 to the length of the portion 55 having a diameter smaller than that of the step part 53B of the diameter-reduction part 53 was 1:1. The ratio of the diameter of the portion 55 to the diameter of the step part 53B of the diameter reduction part 53 was 1.1.

[Evaluation]

Examples 5 and 6 were also subjected to the same test as that of Example 1. In the battery unit 100 of Example 5, a He leak amount was $1 \times 10^{-11}$ Pa·m³/s or less. In the battery unit 100 of Example 6, a He leak amount was $1 \times 10^{-11}$ Pa·m³/s or less.

The above results show that the battery units 100 of Examples 5 and 6 could achieve more excellent sealing performance than that of the battery unit 100 of Example 1.

That is, in the battery according to at least one embodiment and example described above, the restraining member restrains at least a part of the diameter-reduction part of the terminal shaft via the diameter-reduction part of the rising part and the shaft of the gasket. The inclination angle of the rising part is larger than the inclination angle of the terminal shaft. Such a battery can achieve high tightness of contact between the terminal shaft and the gasket and of contact between the rising part and the gasket, and eventually can exhibit high sealing performance. That is, in the battery, the terminal structure capable of exhibiting high sealing performance can be provided on the terminal-connecting part having a small thickness.

While certain embodiments of the present invention have been described, these embodiments have been presented by way of example only, and are not intended to limit the scope of the invention. The novel embodiments may be embodied in a variety of other forms, and various omissions, substitutions and changes may be made without departing from the spirit of the invention. The accompanying claims and their equivalents are intended to cover such forms or modifications as would fall within the scope and spirit of the invention.

What is claimed is:

1. A battery comprising:
    an electrode body;
    a lead electrically connected to the electrode body;
    a container member housing the electrode body and the lead and comprising a terminal-connecting part having a thickness of 0.3 mm or less, the terminal-connecting part comprising a through hole and a rising part extending toward an inside of the container member from an edge part of the through hole, and the rising part comprising a diameter-reduction part having a diameter reduced along a direction toward the inside of the container member from the edge part of the through hole;
    a gasket comprising a hollow shaft inserted into the rising part;
    an external terminal comprising a first end part and a second end part and comprising a terminal shaft extending to an axial direction toward the second end part from the first end part, wherein the terminal shaft passes through the shaft of the gasket, and is electrically connected to the lead, and the terminal shaft comprises a diameter-reduction part having a diameter reduced along the axial direction; and
    a restraining member restraining at least a part of the diameter-reduction part of the terminal shaft via the diameter-reduction part of the rising part and the shaft of the gasket,
    wherein an inclination angle of the diameter-reduction part of the rising part to the axial direction is larger than an inclination angle of the diameter-reduction part of the terminal shaft to the axial direction.

2. The battery according to claim 1,
    wherein a portion sandwiched between the diameter-reduction part of the rising part and the diameter-reduction part of the terminal shaft in the shaft of the gasket comprises a first portion having a maximum thickness and a second portion having a minimum thickness, and the first portion is disposed closer to the edge part of the through hole of the terminal-connecting part than the second portion.

3. The battery according to claim 1, wherein the container member is formed from a metal, an alloy, or a laminate of a resin layer and a metal layer and/or an alloy layer.

4. The battery according to claim 1,
wherein the lead further comprises a through hole, and the terminal shaft of the external terminal is fitted into the through hole of the lead.

5. The battery according to claim 1,
wherein the external terminal further comprises a through hole, the lead further comprises a projection part, and the projection part of the lead is fitted into the through hole of the external terminal.

6. The battery according to claim 1, wherein the lead serves as the restraining member.

7. The battery according to claim 1,
wherein the gasket further comprises a portion mounted on a surface of the terminal-connecting part of the container member, the gasket comprises a main surface and a mounted surface as a back of the main surface, the mounted surface is in contact with the edge part of the through hole of the terminal-connecting part, and the shaft of the gasket extends inside the container member from the mounted surface of the gasket,
the first end part of the external terminal comprises a portion mounted on the main surface of the gasket, the portion of the external terminal comprises an end face and a mounted surface as a back of the end face, and the mounted surface is in contact with the main surface of the gasket,
the external terminal further comprises a projection projected from the mounted surface,
the gasket comprises a recessed part formed in the main surface, and the recessed part corresponds to the projection of the external terminal, and
the projection of the external terminal is fitted into the recessed part of the gasket.

8. The battery according to claim 1,
wherein the diameter-reduction part of the external terminal comprises a peripheral surface on which a step part is formed, and the step part of the diameter reduction part is in contact with an inner surface of the shaft of the gasket.

9. A seal unit comprising:
a seal member comprising a first surface and a second surface as a back of the first surface, wherein the seal member comprises a rising part comprising a tip projected from the second surface, and a through hole passing through the seal member from the first surface to the tip of the rising part, and the through hole comprises a taper part having a diameter that reduces with increasing proximity to the tip of the rising part;
a gasket comprising a through hole; and
a terminal comprising a first end part and a second end part, wherein the terminal comprises a main part extending to an axial direction toward the second end part from the first end part, and the main part comprises a diameter-reduction part between the first end part and the second end part, the diameter-reduction part having a diameter that reduces with increasing proximity to the second end part,
wherein at least a part of the gasket is located in the taper part of the through hole of the seal member,
at least a part of the diameter reduction part of the main part of the terminal is located in the through hole of the gasket,
the at least a part of the gasket is sandwiched between the taper part of the seal member and the diameter-reduction part of the terminal, and
an inclination angle of the taper part of the seal member to the axial direction of the main part of the terminal is larger than an inclination angle of the diameter-reduction part to the axial direction.

10. The seal unit according to claim 9,
wherein the at least a part of the gasket sandwiched between the taper part of the seal member and the diameter-reduction part of the terminal comprises a first portion having a maximum thickness and a second portion having a minimum thickness, and the second portion is disposed closer to the tip of the rising part than the first portion.

11. The seal unit according to claim 9, wherein the rising part has a thickness of 0.3 mm or less.

12. The seal unit according to claim 9, further comprising:
a restraining member surrounding the rising part,
wherein the rising part is sandwiched between the at least a part of the gasket and the restraining member.

13. The seal unit according to claim 9, wherein the seal member is formed from a metal, an alloy, a resin or a laminate of a resin layer and a metal layer and/or an alloy layer.

14. The seal unit according to claim 9, further comprising a lead comprising a terminal-connecting part and a through hole passing through the terminal-connecting part,
wherein the terminal-connecting part faces the second surface of the seal member, and
the main part of the terminal is fitted into the through hole of the lead.

15. The seal unit according to claim 9, further comprising a lead comprising a terminal-connecting part facing the second surface of the seal member and a projection part extending from a surface facing the second surface of the seal member,
wherein the terminal further comprises a recessed part formed in the second end part, or a through hole passing through the terminal from the second end part to the first end part, and
the projection part of the terminal-connecting part is fitted into the recessed part or the through hole of the terminal.

16. The seal unit according to claim 15,
wherein the lead further comprises a portion surrounding the rising part of the seal member, and
the rising part is sandwiched between the at least a part of the gasket and the lead.

17. A battery comprising:
a container having an opening;
an electrode body housed in the container; and
the seal unit according to claim 9 sealing the opening of the container, wherein the second surface faces the electrode body.

* * * * *